(12) United States Patent
Hammad et al.

(10) Patent No.: US 11,410,142 B2
(45) Date of Patent: Aug. 9, 2022

(54) DEVICE ENROLLMENT SYSTEM AND METHOD

(71) Applicant: VISA INTERNATIONAL SERVICE ASSOCIATION, San Francisco, CA (US)

(72) Inventors: Ayman Hammad, Pleasanton, CA (US); Barbara Patterson, South San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1130 days.

(21) Appl. No.: 15/973,410

(22) Filed: May 7, 2018

(65) Prior Publication Data

US 2018/0255460 A1    Sep. 6, 2018

Related U.S. Application Data

(62) Division of application No. 13/237,840, filed on Sep. 20, 2011, now abandoned.

(Continued)

(51) Int. Cl.
*G06Q 20/12* (2012.01)
*G06Q 20/32* (2012.01)
(Continued)

(52) U.S. Cl.
CPC ......... *G06Q 20/12* (2013.01); *G06Q 20/3223* (2013.01); *G06Q 20/3674* (2013.01);
(Continued)

(58) Field of Classification Search
None
See application file for complete search history.

(56) References Cited

U.S. PATENT DOCUMENTS 5,371,797 A * 12/1994 Bocinsky, Jr. ......... G06Q 20/04
340/5.41
5,892,900 A *  4/1999 Ginter ................... G06Q 20/12
726/26

(Continued)

FOREIGN PATENT DOCUMENTS

KR    20070003403    1/2007
KR    20100012264    2/2010

(Continued)

OTHER PUBLICATIONS

Merkle R.C. (1990) One Way Hash Functions and DES. In: Brassard G. (eds) Advances in Cryptology—CRYPTO' 89 Proceedings. CRYPTO 1989. Lecture Notes in Computer Science, vol. 435. Springer, New York, NY. https://doi.org/10.1007/0-387-34805-0_40 (Year: 1990).*

(Continued)

*Primary Examiner* — Jacob C. Coppola
*Assistant Examiner* — Eduardo Castilho
(74) *Attorney, Agent, or Firm* — Kilpatrick, Townsend & Stockton LLP

(57) ABSTRACT

Embodiments related to systems and methods comprising receiving payment data at an access device; receiving an identifier for a mobile device at the access device; and generating and sending an authorization request message to a payment processing network, wherein the payment processing network generates a verification token, which is then sent to the mobile device whereby the mobile device is thereafter used to conduct payment transactions.

18 Claims, 23 Drawing Sheets

Related U.S. Application Data

(60) Provisional application No. 61/385,124, filed on Sep. 21, 2010.

(51) Int. Cl.
*G06Q 20/36* (2012.01)
*G06Q 20/38* (2012.01)
*G06Q 20/40* (2012.01)
*G06Q 20/42* (2012.01)
*H04W 12/069* (2021.01)

(52) U.S. Cl.
CPC ....... *G06Q 20/385* (2013.01); *G06Q 20/3825* (2013.01); *G06Q 20/38215* (2013.01); *G06Q 20/4018* (2013.01); *G06Q 20/42* (2013.01); *H04W 12/069* (2021.01)

(56) References Cited

U.S. PATENT DOCUMENTS

| | | | |
|---|---|---|---|
| 7,225,156 B2 * | 5/2007 | Fisher | G06Q 20/26 705/50 |
| 7,379,921 B1 | 5/2008 | Kiliccote | |
| 7,702,577 B1 * | 4/2010 | Dickelman | G06Q 20/38 705/39 |
| 7,802,720 B2 | 9/2010 | Yang | |
| 7,849,014 B2 | 12/2010 | Erikson | |
| 8,156,543 B2 | 4/2012 | Wentker et al. | |
| 8,346,666 B2 | 1/2013 | Lindelsee et al. | |
| 8,380,177 B2 * | 2/2013 | Laracey | G06Q 20/108 455/414.1 |
| 8,380,574 B2 | 2/2013 | Naccache et al. | |
| 8,396,747 B2 * | 3/2013 | Bachenheimer | G06Q 20/20 705/16 |
| 8,566,239 B2 * | 10/2013 | Arthur | G06Q 20/12 705/41 |
| 8,631,231 B2 | 1/2014 | Wentker et al. | |
| 8,700,729 B2 | 4/2014 | Dua | |
| 2002/0091646 A1 * | 7/2002 | Lake | G06Q 20/12 705/67 |
| 2002/0181710 A1 | 12/2002 | Adam et al. | |
| 2003/0061503 A1 | 3/2003 | Katz et al. | |
| 2004/0030659 A1 * | 2/2004 | Gueh | G06Q 20/3674 705/67 |
| 2004/0098350 A1 | 5/2004 | Labrou et al. | |
| 2006/0206709 A1 | 9/2006 | Labrou et al. | |
| 2006/0224470 A1 | 10/2006 | Garcia Ruano et al. | |
| 2008/0005037 A1 | 1/2008 | Hammad | |
| 2008/0011825 A1 | 1/2008 | Giordano et al. | |
| 2008/0059375 A1 * | 3/2008 | Abifaker | G06Q 20/322 705/44 |
| 2008/0140576 A1 * | 6/2008 | Lewis | G06Q 20/4016 705/318 |
| 2008/0208742 A1 | 8/2008 | Arthur et al. | |
| 2008/0208743 A1 | 8/2008 | Arthur et al. | |
| 2008/0319896 A1 | 12/2008 | Carlson et al. | |
| 2009/0037285 A1 * | 2/2009 | Murphy | G06Q 20/40 705/16 |
| 2009/0055893 A1 * | 2/2009 | Manessis | G06Q 20/385 726/2 |
| 2009/0104888 A1 | 4/2009 | Cox | |
| 2009/0119194 A1 * | 5/2009 | Chau | G06Q 20/385 705/35 |
| 2009/0144193 A1 * | 6/2009 | Giordano | G06Q 20/229 705/39 |
| 2009/0173782 A1 | 7/2009 | Muscato | |
| 2009/0307140 A1 * | 12/2009 | Mardikar | G06Q 20/3278 705/71 |
| 2010/0106570 A1 * | 4/2010 | Radu | G06Q 20/387 705/14.3 |
| 2010/0121767 A1 * | 5/2010 | Coulter | G06Q 20/3674 705/17 |
| 2010/0125516 A1 * | 5/2010 | Wankmueller | G06Q 40/00 705/35 |
| 2010/0153272 A1 | 6/2010 | Wentker et al. | |
| 2011/0022484 A1 * | 1/2011 | Smith | G06Q 20/4016 705/17 |
| 2011/0022515 A1 * | 1/2011 | Tallitsch | G06Q 20/3255 705/40 |
| 2011/0031310 A1 * | 2/2011 | Wilson | G06Q 20/12 235/380 |
| 2011/0035302 A1 * | 2/2011 | Martell | G06Q 20/102 705/34 |
| 2011/0042456 A1 * | 2/2011 | Masaryk | G06Q 20/343 235/380 |
| 2011/0047045 A1 * | 2/2011 | Brody | G06Q 20/28 705/26.41 |
| 2011/0078076 A1 | 3/2011 | Scipioni et al. | |
| 2011/0153496 A1 * | 6/2011 | Royyuru | G06Q 20/12 705/44 |
| 2011/0165836 A1 * | 7/2011 | Dixon | G06Q 20/32 455/41.1 |
| 2011/0196782 A1 | 8/2011 | Allen et al. | |
| 2011/0202466 A1 * | 8/2011 | Carter | G06Q 20/32 705/67 |
| 2011/0238473 A1 | 9/2011 | Sankolli et al. | |
| 2012/0150737 A1 | 6/2012 | Rottink et al. | |

FOREIGN PATENT DOCUMENTS

| | | |
|---|---|---|
| KR | 20100034688 | 4/2010 |
| KR | 20100079665 | 7/2010 |

OTHER PUBLICATIONS

Y. Labrou, J. Agre, L. Ji, J. Molina and W.-. Chen, "Wireless wallet," The First Annual International Conference on Mobile and Ubiquitous Systems: Networking and Services, 2004. MOBIQUITOUS 2004., 2004, pp. 32-41, doi: 10.1109/MOBIQ.2004.1331708. (Year: 2004).*

Yingjiu Li and Xinwen Zhang, "A security-enhanced one-time payment scheme for credit card," 14th International Workshop Research Issues on Data Engineering: Web Services for e-Commerce and e-Government Applications, 2004. Proceedings., 2004, pp. 40-47, doi: 10.1109/RIDE.2004.1281701. (Year: 2004).*

R. Abdellaoui, M. Pasquet and O. Berthelier, "Integration of new electronic payment systems into B2C internet commerce," 2011 International Conference on Collaboration Technologies and Systems (CTS), 2011, pp. 484-491, doi: 10.1109/CTS.2011.5928727. (Year: 2011).*

U.S. Appl. No. 13/401,121 , "Notice of Allowance", dated May 13, 2014, 7 pages.

PCT/US2011/052631 , "International Search Report and Written Opinion", dated Mar. 2, 2012, 9.

* cited by examiner

Welcome to the Store!
Terminal ID #0049

If you would like to use your website account to conduct this purchase, please activate your application on your mobile phone now

OR

Click here to connect to your mobile phone — 1702

If you would like to complete enrollment of your website account to use your mobile phone to conduct transactions, please enter your website login below:

Username — 1704

Password — 1706

DEVICE ENROLLMENT SYSTEM AND METHOD

CROSS-REFERENCES TO RELATED APPLICATIONS

This application is a divisional application of U.S. application Ser. No. 13/237,840, filed Sep. 20, 2011, which is a non-provisional of and claims benefit of the filing date of U.S. provisional patent application No. 61/385,124, filed on Sep. 21, 2010, which is herein incorporated by reference in its entirety for all purposes.

BACKGROUND

Payment card based electronic payment transactions can be characterized as two types. One type of transaction is a card present type of transaction, while another type transaction is a card not present type of transaction.

In a card present type of transaction, a person may use a payment card such as a credit card to conduct the transaction. Prior to conducting the transaction, the merchant may obtain and check the person's payment card to confirm that he is the actual holder of the card. For example, the merchant may ask for the person's driver's license to confirm that the name on the driver's license is the same name that is on the payment card. Once this is done, the person may take the payment card and swipe it by the merchant's POS (point of service) terminal to start the process of authorizing the transaction. The POS terminal may generate and send an authorization request message to an issuer of the payment card. The issuer may subsequently approve or not approve of the transaction.

Another type of payment transaction is a "card not present" type of transaction. An example of a card not present type of transaction is an online purchase transaction. In a card not present type of transaction, the online merchant does not physically verify that the consumer is actually in possession of a payment card that is being used to conduct the transaction. To purchase goods or services online, a consumer only needs to possess the account number associated with the card and perhaps a card verification value (CVV2) associated with the card. In an online transaction, a human being does not verify that the consumer purchasing the goods is in physical possession of the card that is used to conduct the transaction.

Because nobody has verified that the person conducting the transaction is actually in physical possession of the card that is being used to conduct the transaction, the possibility of fraud can be considered greater than in a card present type of transaction, as compared to a card not present type of transaction. Because of the higher risk associated with card not present type of transactions, card not present transactions may be subject to higher processing fees (e.g., interchange fees) than card present types of transactions.

Recently, mobile phones have been provided with contactless devices (e.g., an RF or radio frequency transmitter), which can allow them to be used as contactless payment devices. Although a mobile phone can be physically present at a physical point of sale when a person conducts a purchase transaction in person at a merchant, the purchase transaction would generally be considered card not present types of transactions. This is because a physical card is not present during the transaction and since the mobile phone would not possess the necessary security attributes (e.g., holograms, card verification values, secure chip) that a card might have. Thus, transactions conducted with contactless phones would likely be subject to higher processing fees than transactions conducted using traditional payment cards, even though contactless phones are used to conduct in person payment transactions.

Furthermore, the security of transactions conducted using mobile phones could also be improved. In order to successfully conduct payment transactions using mobile phones, there needs to be a certain degree of trust between the person using the mobile phone, the issuer that is linked to the mobile phone, and the payment processing organization that processes payment transactions conducted with the mobile phone.

It would be desirable to improve payment systems and methods so that transactions can be securely conducted with mobile communication devices.

Embodiments of the invention address these and other problems.

BRIEF SUMMARY

Embodiments of the invention include methods and systems that can be used to improve the security and speed of payment transactions conducted using a mobile communication device such as a mobile phone.

One embodiment of the invention is directed to a method comprising receiving payment data at an access device, and receiving an identifier for a mobile device at the access device. The method also includes generating and sending an authorization request message to a server computer, wherein the server computer generates a verification token, wherein the verification token is then sent to the mobile device and is stored in the mobile device, whereby the mobile device is thereafter used to conduct payment transactions.

Another embodiment of the invention is directed to an access device comprising a processor and a computer readable medium coupled to the processor. The computer readable medium comprises, code executable by the processor, for implementing a method comprising receiving payment data, receiving an identifier for a mobile device, and generating and sending an authorization request message to a server computer. The server computer generates a verification token, where the verification token is then sent to the mobile device and is stored in the mobile device, whereby the mobile device is thereafter used to conduct payment transactions.

Another embodiment of the invention is directed to a system comprising an access device comprising (a) a processor, and (b) a computer readable medium coupled to the processor. The computer readable medium comprises code executable by the processor, for implementing a method comprising receiving payment data, receiving an identifier for a mobile device, and generating and sending an authorization request message to a server computer, wherein the server computer generates a verification token. The verification token is then sent to the mobile device, whereby the mobile device is thereafter used to conduct payment transactions. The system also includes a mobile device configured to interact with the access device.

Another embodiment of the invention is directed to a method comprising electronically transmitting payment data to a server computer, and electronically receiving, at a mobile device, a verification token from the server computer. The method also includes storing, in a memory on the mobile device, the verification token, whereby the mobile device is thereafter used to conduct payment transactions.

Another embodiment of the invention is directed to a method comprising: receiving payment card data at an access device, receiving an identifier for a phone at the access device, and generating and sending an authorization request message to a server computer associated with a payment processing network. The server computer is associated with the payment processing network and generates a verification token. The verification token indicates that subsequent transactions conducted by the phone are to be processed as card present transactions. The verification token is then sent to the phone and is stored in the phone. The phone is thereafter used to conduct payment transactions, where the payment transactions are processed as card present transactions.

Another embodiment of the invention is directed to an access device comprising: a processor, and a computer readable medium coupled to the processor. The computer readable medium comprises code executable by the processor, for implementing a method. The method comprises receiving payment card data, receiving an identifier for a phone, and generating and sending an authorization request message to a server computer associated with a payment processing network. The server computer is associated with the payment processing network and generates a verification token. The verification token indicates that subsequent transactions conducted by the phone are to be processed as card present transactions. The verification token is then sent to the phone and is stored in the mobile device. The mobile device is thereafter used to conduct payment transactions, where the payment transactions are processed as card present transactions.

Another embodiment of the invention is directed to a system comprising an access device comprising (a) a processor, and (b) a computer readable medium coupled to the processor. The computer readable medium comprises, code executable by the processor, for implementing a method comprising receiving payment card data, receiving an identifier for a phone, and generating and sending an authorization request message to a server computer associated with a payment processing network. The payment processing network generates a verification token, and the verification token indicates that subsequent transactions conducted by the phone are to be processed as card present transactions. The verification token is then sent to the phone, whereby the phone is thereafter used to conduct payment transactions, and wherein the payment transactions are processed as card present transactions. The system also includes a phone configured to interact with the access device.

Another embodiment of the invention is directed to a phone comprising: a processor; an antenna coupled to the processor; a computer readable medium, the computer readable medium comprising code for a verification token, wherein the verification token, is configured to allow the phone to be used to conduct transactions as a card present transactions.

Another embodiment of the invention is directed to a server computer comprising: a processor; and a computer readable medium comprising code, executable by the processor for implementing a method comprising receiving a verification token from a phone during a payment transaction; and conducting the payment transaction as a card not present transaction.

In some embodiments, the verification token can be present in an authentication request message. In other embodiments, the verification token can be present in a request for a verification value, where the verification value is subsequently sent to the consumer and is subsequently received in an authorization request message.

These and other embodiments are described in further detail below in the Detailed Description with reference to the Figures.

BRIEF DESCRIPTION OF THE DRAWINGS

FIG. 17 shows an exemplary user interface on an access device according to an embodiment of the invention.

DETAILED DESCRIPTION

Figure 1:
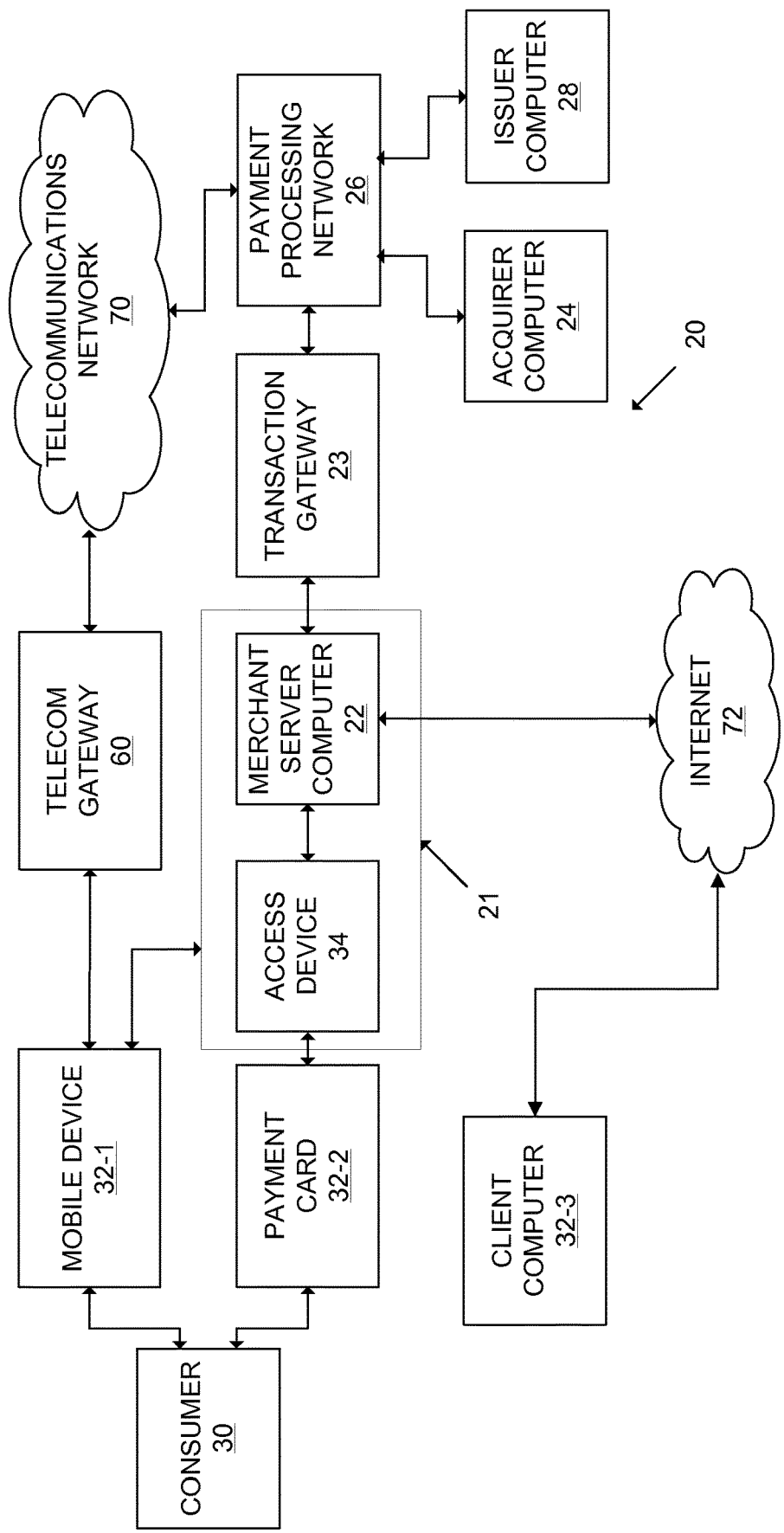
FIG. 1 shows a block diagram of an exemplary system that can be used in some embodiments of the invention.

As noted above, card present transactions can be distinguished from card not present types of transactions. In a card present transaction, a consumer is in possession of a portable consumer device, such as a payment card, at a point of sale at a merchant location. The consumer may also conduct a card present transaction with a mobile device, such as a phone, that is enabled with a near-field communication chip, or other suitable chip, to interact with a point of sale device at the merchant location. Since card present transactions are conducted in-person, the merchant can verify the identity of a person wishing to make the transaction as a consumer associated with the payment card.

In a card not present transaction, the consumer does not have a payment card at the merchant location. Examples of card not present types of transactions include Internet transactions and mail order and telephone order types of transactions. Because a merchant is not able to verify the presence of a card or verify the identity of the person wishing to conduct the transaction, there are higher risks for merchants and issuers associated with conducting card not present transactions. Thus, card not present transactions can be subject to higher processing fees and/or interchange rates than card present types of transactions.

Embodiments of the invention provide for greater security. Embodiments of the invention also allow a person to conduct a payment transaction with a mobile device (e.g., a phone) and that payment transaction can be treated as a card present type of payment transaction. This is the case even though the mobile device does not have the type of chip that would normally be required for a card present transaction. Because embodiments of the invention allow transactions conducted using a mobile device to be processed as a card present transaction, processing fees (e.g., interchange fees) can be reduced because the transactions are more secure.

Prior to discussing the specific embodiments of the invention, further descriptions of some terms can be provided for a better understanding of embodiments of the invention.

A "verification token" may be any suitable piece of information that can be used to verify that a consumer has presented a payment card or other authentic payment credential to a merchant for verification. Verification tokens may be in any suitable form and any suitable length. Verification tokens may be in the form of numbers, letters, or combinations thereof. In some embodiments, a verification token according to an embodiment of the invention may be the form of an activation code or a portion thereof (e.g., half or less than half of an activation code). In some embodiments, the verification token may be static, while in other embodiments, it may be dynamic.

"Payment data" may include any suitable information suitable for conducting a payment transaction. Payment data may include an account number, expiration date, service code, CVV (card verification value) and dCVV (dynamic card verification value) values, etc. Payment data can be stored on a mobile device, a payment card, or any other suitable portable consumer device.

"Payment card data" may be an example of "payment data." In the description below, reference to "payment data" may also be a reference to "payment card data" if the data is associated with a payment card. "Payment card data" may include any suitable information associated with a payment card suitable for conducting a payment transaction. Payment card data may be encoded on a magnetic stripe present the payment card, printed or embossed on the payment card, or any other suitable method of display or storage. Exemplary payment cards may include credit cards, debit cards, or any other suitable payment card.

An "identifier" for a mobile device can be any suitable information that can be used to identify a mobile device such as a mobile phone. An example of an identifier for a mobile device may be a mobile phone number.

A "mobile device" may be any suitable mobile communication device. A suitable mobile device may be in the form of a mobile phone, and may include an antenna, as well as a processor and a memory. It may also include a contactless element so that it can communicate using a short range wireless communication medium. A mobile device may be a device that can be easily transported, and can be in any suitable form. For example, suitable mobile devices can be hand-held, compact, and enabled to communicate over a network interface, and may have an associated device identifier (e.g., mobile phone number). In some embodiments, mobile devices may be enabled to download applications (e.g., apps) from a merchant website (e.g., iTunes™) to perform specialized tasks. Examples of mobile devices include cellular phones, PDAs, personal computers (PCs), tablets, key fobs, and the like.

An "access device" may be any suitable device that can interact with the mobile device and/or a payment card. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

An "issuer" may be any business entity (e.g., a bank). Typically, an issuer is a financial institution, such as a bank. The issuer issues portable consumer devices to the consumer that may be used to conduct a transaction, such as a credit or debit card to the consumer.

An "acquirer" is typically a business entity, e.g., a commercial bank that has a business relationship with a particular merchant. Some entities such as American Express perform both issuer and acquirer functions. Embodiments of the invention encompass such single entity issuer-acquirers.

A "payment processing network" may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server and may host a merchant website.

An "authorization request message" can include a request for authorization to conduct an electronic payment transaction. It may further include an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards.

An "authorization response message" can be a message that includes an authorization code, and may typically be produced by an issuer. The authorization response message can provide an indication of whether or not a transaction is authorized.

Authorization request messages, authorization response messages, and other confidential data transmitted may be susceptible to interception, compromising secure data relating to the consumer or the consumer's payment information, such as a payment card identifier. To prevent identity and other payment information theft, "encryption" may be used. Encryption allows merchants, issuers, acquirers, and other entities to verify the identity of the source of the information (e.g., a valid consumer) by altering data transmitted so that to anyone other than an intended recipient the data is unreadable or meaningless. When the intended recipient receives the data, the intended recipient decrypts the data.

Security keys are often used to encrypt and decrypt messages, and may be used in conjunction with mathematical formulas or algorithms. Security keys are created in pairs, so that if someone encrypts a message with a key, only someone else with a matching key will be able to decrypt the message. There are secret key pairs and public key pairs. Public key encryption is typically used in Internet communications. In public key encryption, there is a "public key" and a "private key." The public key is made freely available, whereas the private key is kept privately and secretly on a consumer's computer, consumer's mobile device, or merchant access device. The public key can encrypt messages, but only the private key can decrypt messages the public key has encrypted.

"Digital certificates" use encryption to verify that an entity sending data, such as a consumer sending payment card information, is valid (e.g., a consumer sending the payment card information is the consumer associated with the payment card information sent). A digital certificate is unique for each entity, so when a consumer with a digital certificate goes to a merchant website, that digital certificate is presented to the merchant's website and verifies that the consumer is who he or she claims to be. Digital certificates are issued by certificate authorities or other suitable entity not directly involved in a transaction in which digital certificates are needed to verify identities of the parties conducting the transaction.

I. Systems

Systems Overview

A system according to an embodiment of the invention is shown in FIG. 1.

FIG. 1 shows a system 20 that can be used in an embodiment of the invention. The system 20 includes a merchant computer 22 and an access device 34 operated by a merchant 21, and an acquirer computer 24 associated with the merchant computer 22. In a typical payment transaction, a consumer 30 may purchase goods or services at the merchant 21 using a portable consumer device such as a payment card 32-2. The consumer 30 may be an individual (e.g., a user), or an organization such as a business that is capable of purchasing goods or services. The acquirer computer 24 can communicate with an issuer computer 28 via a payment processing network 26.

As described above, an "issuer" is typically a business entity (e.g., a bank) which maintains financial accounts for the consumer and often issues a portable consumer device such as a credit or debit card to the consumer. A "merchant" is typically an entity that engages in transactions, such as a store, person, or service provider. As used herein, an "acquirer" is typically a business entity, e.g., a commercial bank that has a business relationship with a particular merchant or other entity. Some entities can perform both issuer and acquirer functions. Embodiments of the invention encompass such single entity issuer-acquirers.

In FIG. 1, a consumer 30 is illustrated. Consumer 30 can use at least two different types of portable consumer devices including mobile device 32-1 and a payment card 32-2. In one example, the mobile device 32-1 may be a mobile phone. The payment card 32-2 may be a credit, debit, or prepaid card. The mobile device 32-1 may be used to communicate with the issuer of the payment card via a telecommunications gateway 60, a telecommunications network 70, and a payment processing network 26. The issuer may operate an issuer computer 28. As will be explained in further detail below, the mobile device 32-1 and the payment card 32-2 could be linked to the same issuer account number, or could be linked to respectively different issuer account numbers. Lastly, consumer 30 may use a specific type of client computer 32-3 such as a personal computer to communicate with the merchant computer 22 via the Internet 72.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant computer 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

Figure 2A:
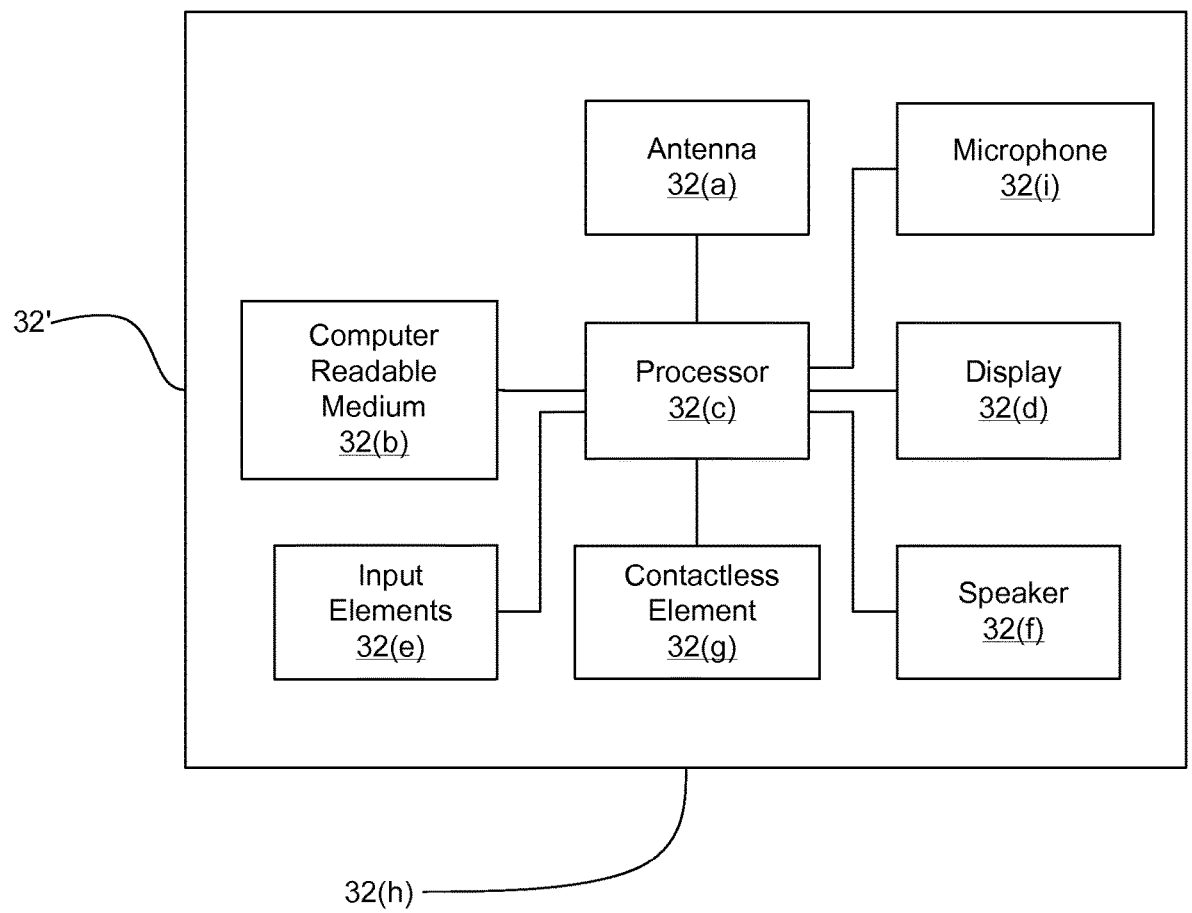
FIG. 2(a) shows a block diagram of an exemplary consumer device in the form of a phone.

The access device 34 may comprise a processor, and a computer readable medium coupled to the processor. The computer readable medium comprises, code executable by the processor, for implementing a method comprising: receiving payment data; receiving an identifier for a mobile device; and generating and sending an authorization request message to a server computer, wherein the server computer generates a verification token, wherein the verification token is then sent to the mobile device and is stored in the mobile device, whereby the mobile device is thereafter used to conduct payment transactions Exemplary Consumer Devices, Access Devices, and Computer Apparatuses FIG. 2(a) shows a block diagram showing some components of a mobile device 32' that can be used in embodiments of the invention. The exemplary mobile device 32' (e.g., mobile phone) may comprise a computer readable medium and a body as shown in FIG. 2(a). The computer readable medium 32(b) may be present within the body 32(h), or may be detachable from it. The body 32(h) may be in the form a plastic substrate, housing, or other structure. The computer readable medium 32(b) may be a memory that stores data (e.g., data relating to issuer specific payment services, verification token) and may be in any suitable form including a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, verification token, etc. Any of this information may be transmitted by the mobile device 32'.

In some embodiments, information in the memory may also include data in the form of data tracks that are traditionally associated with credit and/or debit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) phone 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 32' and an interrogation device. Thus, the mobile device 32' is capable of communicating and transferring data and/or control instructions via both cellular network and near field communications capability.

The mobile device 32' may also include a processor 32(c) (e.g., a microprocessor) for processing the functions of the mobile device 32' and a display 32(d) to allow a consumer to see phone numbers and other information and messages. The mobile device 32' may further include input elements 32(e) to allow a consumer to input information into the device, a speaker 32(f) to allow the consumer to hear voice communication, music, etc., and a microphone 32(i) to allow the consumer to transmit her voice through the mobile device 32'. The mobile device 32' may also include an antenna 32(a) for wireless data transfer (e.g., data transmission).

Figure 2B:
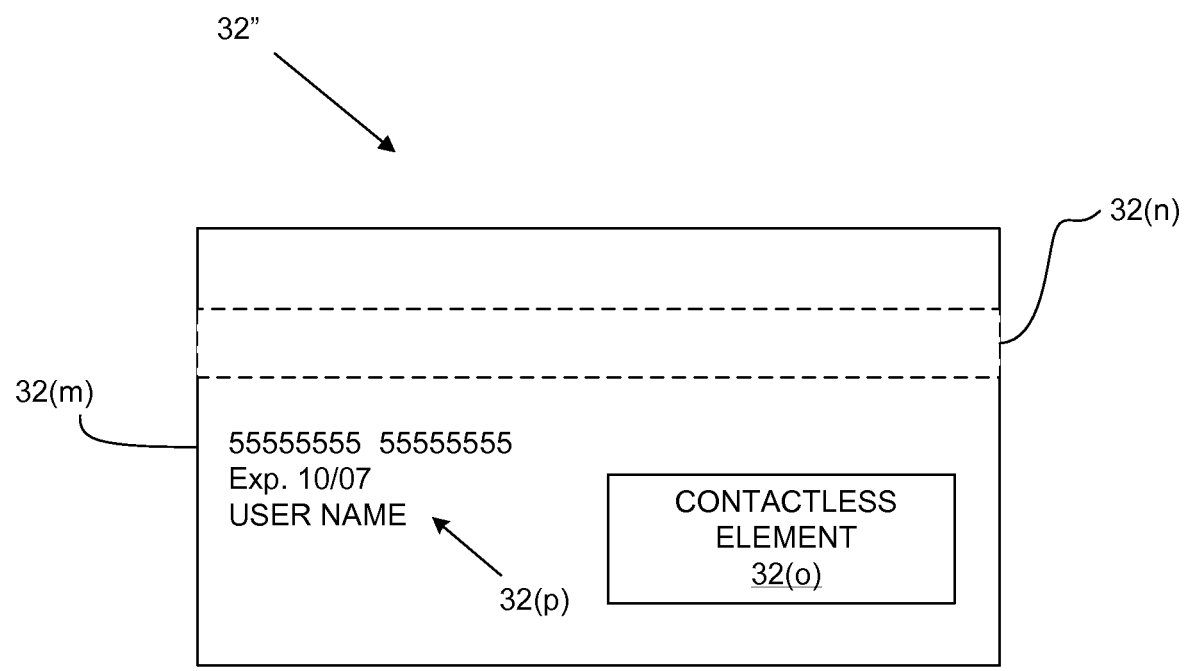
FIG. 2(b) shows an illustration of an exemplary payment card.

FIG. 2(b) shows a payment card 32", which may include a magnetic stripe 32(n) on a plastic body 32(m). It may also have an embossed region 32(p) with information such as the cardholder's name, as well as a contactless element 32(o) for contactless communication. The contactless element 32(o) may have the same or different features as the contactless element 32(g) described above.

Figure 3:
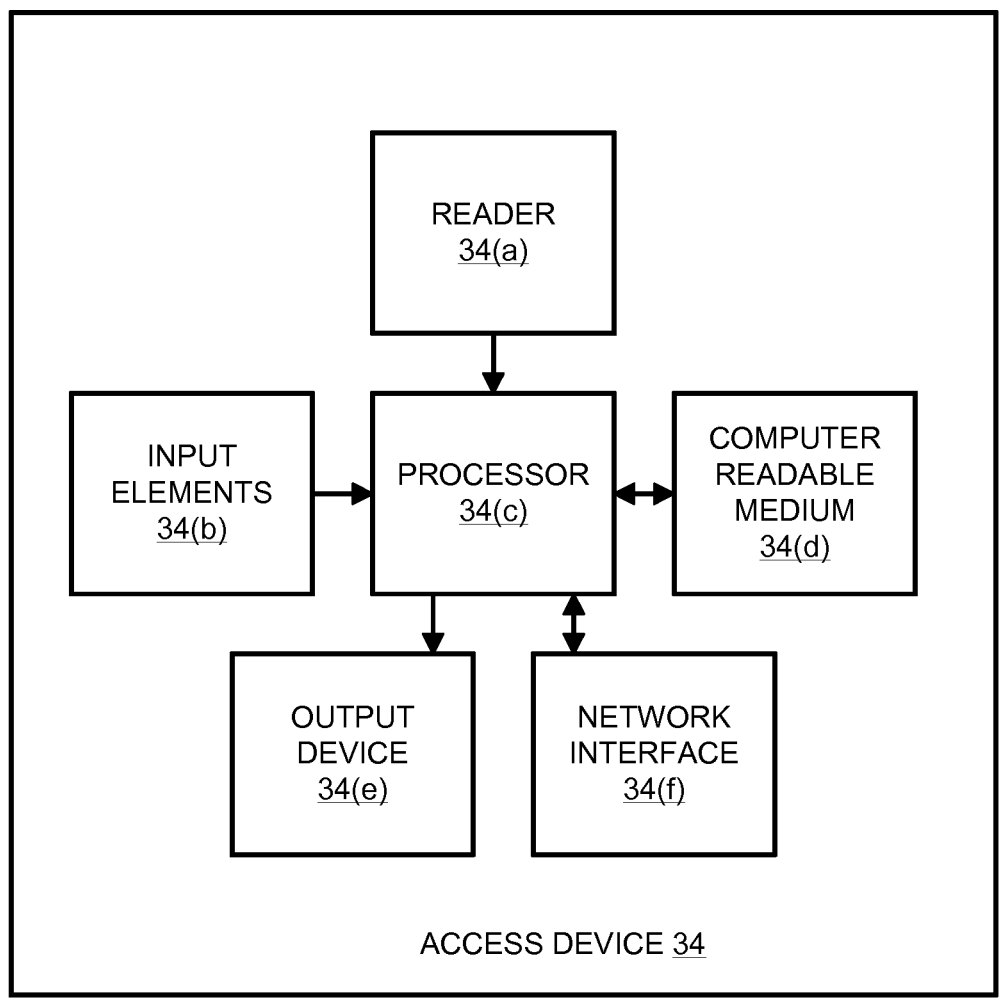
FIG. 3 shows a block diagram of an exemplary access device according to an embodiment of the invention.

FIG. 3 shows a block diagram of an access device 34 according to an embodiment of the invention. The access device 34 comprises a processor 34(c) operatively coupled to a computer readable medium 32(d) (e.g., one or more memory chips, etc.), input elements 32(b) such as buttons or the like, a reader 32(a) (e.g., a contactless reader, a magnetic stripe reader, etc.), an output device 32(e) (e.g., a display, a speaker, etc.) and a network interface 32(f).

Figure 4:
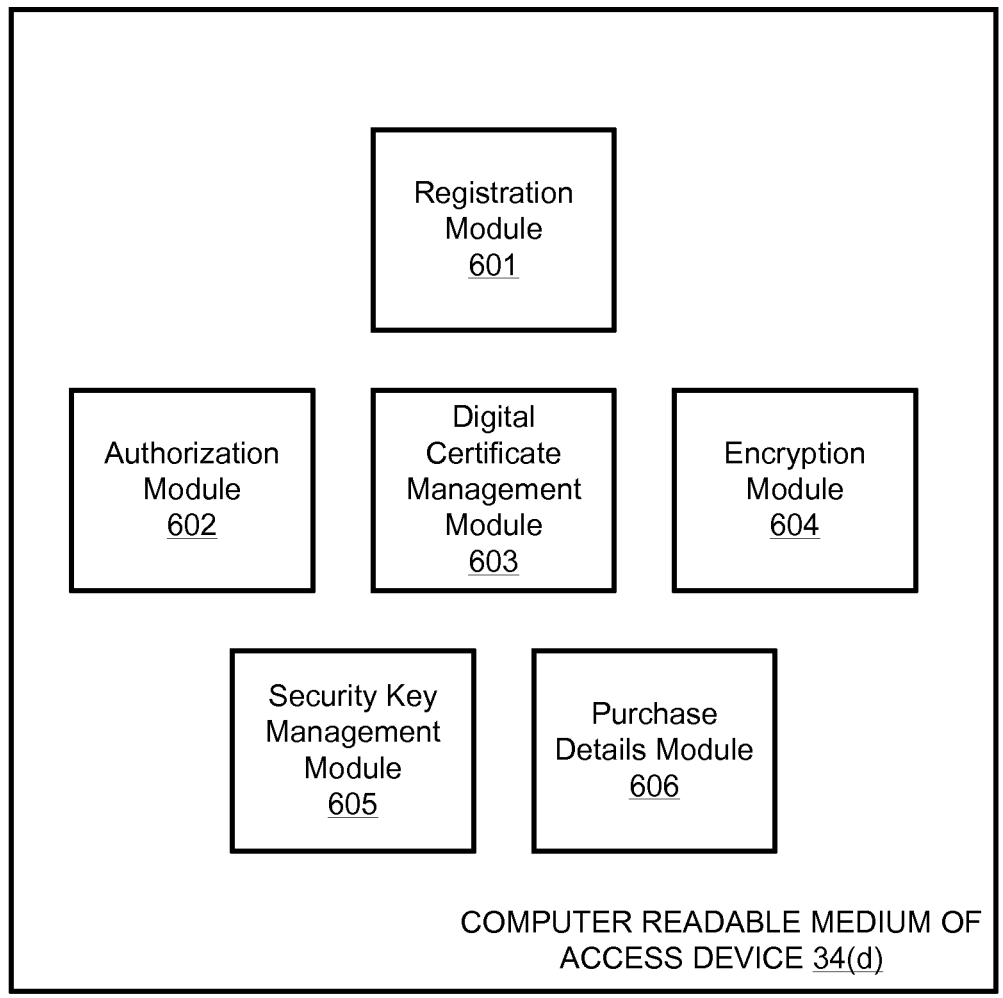
FIG. 4 shows a block diagram of an exemplary computer readable medium of an access device according to an embodiment of the invention.

A block diagram of the computer readable medium 32(d) of the access device 34 is shown in FIG. 4. The computer readable medium may comprise various software modules, such as a registration module 601 to determine if a mobile device in communication with the access device has been enrolled and to register the mobile device. When the mobile device has been verified, an authorization module 602 may authorize the transaction, by generating an authorization request message. The authorization request message may contain data, including details of the purchase (e.g., purchase amount), which are determined by a purchase details module 606. To secure the transmission of the authorization request message, it may be encrypted by an encryption module 604 with security keys. A security key management module 605 may manage and store both private and public keys. The computer readable medium 34(d) of the access device 34 may also comprise a digital certificate management module 603 to manage and store digital certificates for security and verification purposes.

Figure 5:
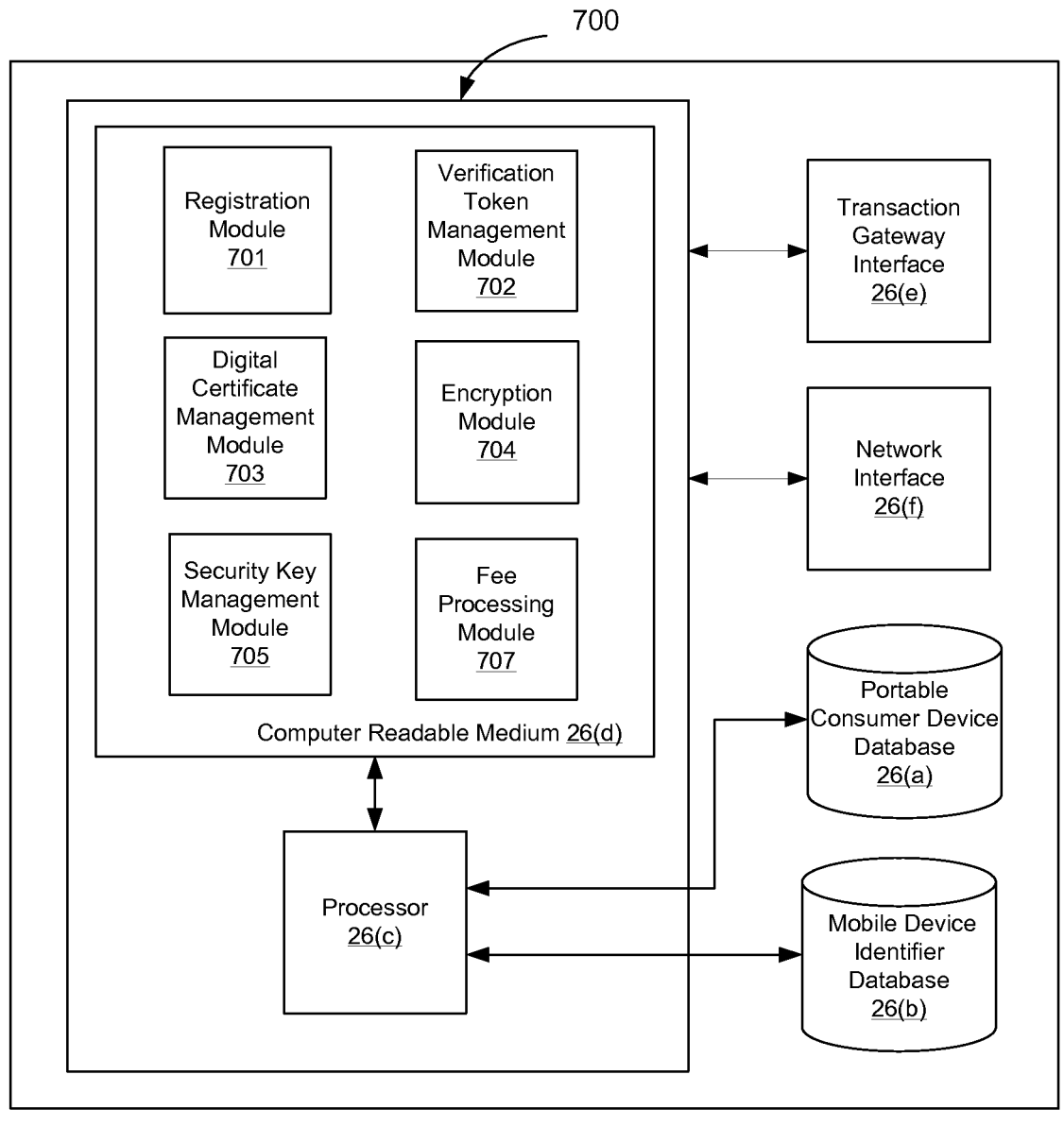
FIG. 5 shows a block diagram of an exemplary payment processing network according to an embodiment of the invention.

FIG. 5 shows a block diagram showing some elements of a payment processing network 26 according to an embodiment of the invention. The payment processing network 26 may comprise a server computer 700, comprising a processor 26(c) and a computer readable medium 26(d). The computer readable medium 26(d) may comprise software modules containing code executable by the processor 26(c) to perform exemplary tasks shown in FIG. 2. The software modules may include a registration module 701 to manage enrolling mobile devices to be registered to conduct transactions with access devices at merchant locations.

The payment processing network 26 may also comprise a payment account database 26(a) and a mobile device identifier database 26(b) accessed by the processor 26(c). The payment account database 26(a) may store data associated with a plurality of payment accounts associated with a plurality of payment cards. The payment accounts may also be associated with a plurality of mobile devices, and the mobile device identifiers may be stored in the mobile device identifier database 26(b). These databases may be used during the enrollment process of registering mobile devices to conduct transactions with access devices at merchant locations.

When a mobile device has been enrolled using an enrollment process according to an embodiment of the invention, the payment processing network 26 may generate a verification token using a verification token management module 702. The verification token may be electronically transmitted to the mobile device. All transmissions received and transmitted, including authorization request messages, authorization response messages, and verification tokens, may be encrypted by an encryption module 704 using security keys. A security key management module 705 may manage and store both private and public keys. The computer readable medium 26(d) of the payment processing network 26 may also comprise a digital certificate management module 703 to manage and store digital certificates for security and verification purposes. A processing fees module 707 may also be used to calculate fees associated with transactions, and can adjust fees based upon whether certain transactions are identified as card present or card not present transactions.

The server computer 700 of the payment processing network 26 may communicate with hardware, such as a transaction gateway interface 26(e) and a network interface 26(f). The transaction gateway interface 26(e) allows the payment processing network 26 to electronically receive authorization request messages and electronically transmit authorization response messages to other entities, such as an access device at a merchant, an issuer, an acquirer, or any other entity involved in the transaction. The network interface 26(*f*) allows the payment processing network 26 to connect to a telecommunications network, the Internet, or any other suitable network to electronically communicate with other entities.

Figure 15:
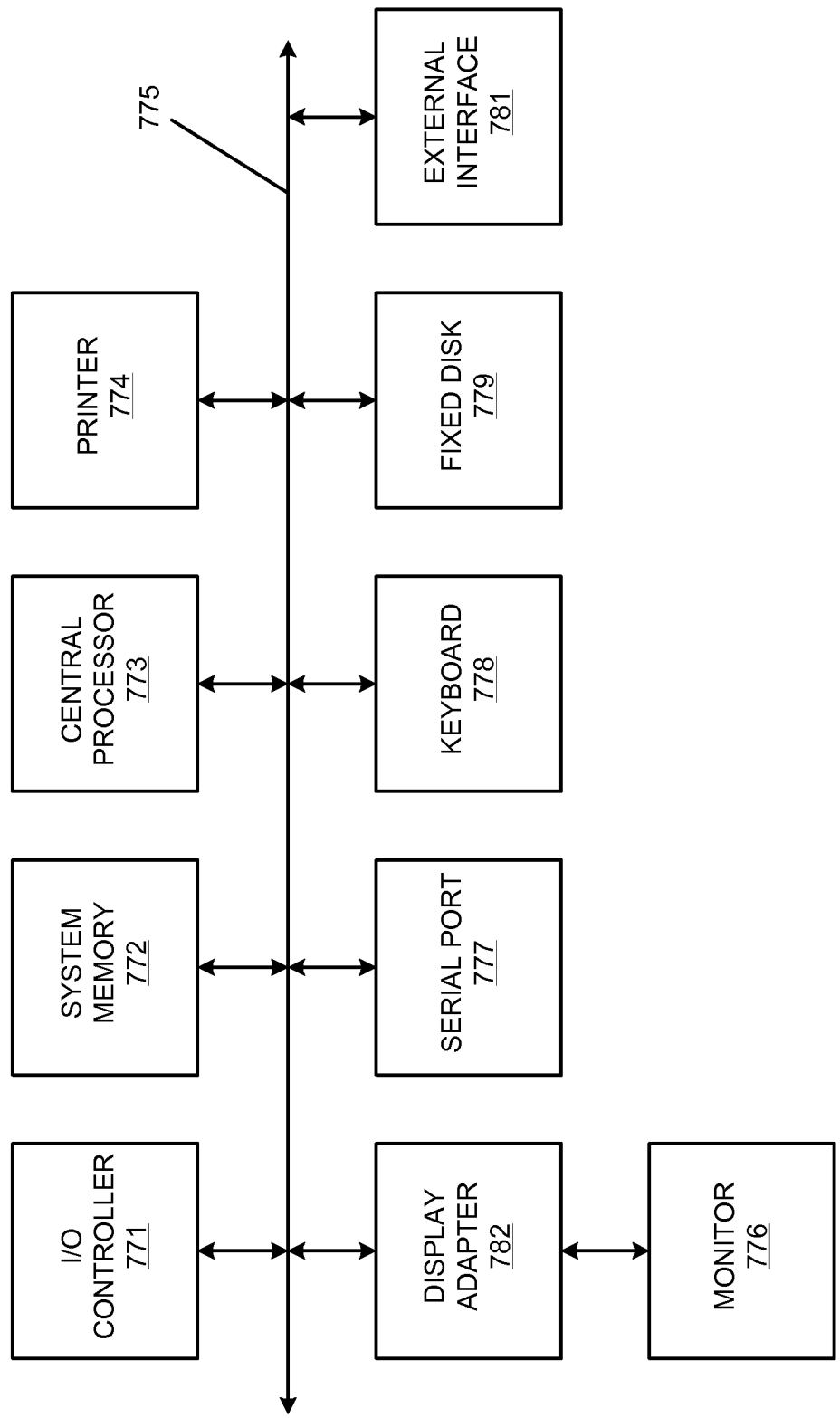
FIG. 15 shows a block diagram of an exemplary computer apparatus according to an embodiment of the invention.

The various participants and elements in FIG. 1 may operate one or more computer apparatuses (e.g., a server computer) to facilitate the functions described herein. Any of the elements in FIG. 1 may use any suitable number of subsystems to facilitate the functions described herein. Examples of such subsystems or components are shown in FIG. 15. The subsystems shown in FIG. 15 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

II. Methods

A method according to an embodiment of the invention can be described with reference to the flowchart in FIG. 2, with reference to the system diagram in FIG. 1. Embodiments of the invention can allow a consumer to enroll in a program (such as a program to load a verification token on a phone, rewards program, alerts program, or other program) using an access device (e.g., a POS terminal) at a merchant.

First, the consumer 30 can use a payment card (e.g., payment card 32-2) to interact with the access device 34 (step 202). Payment data (e.g., an account number, expiration date, service code, etc.), which may include account data, can pass from the card to the access device 34. In response to this, the access device 34 can prompt the user to enter at least his phone number (and other information such as your device ID, e-mail address, etc.) to enroll his phone (e.g., portable mobile device 32-1) as a payment device (step 204). In another embodiment, the consumer 30 may log onto a computer and may go to a host site or portal (e.g., iTunes™) run by the merchant computer 22. The consumer's information (e.g., the phone number, e-mail address, birthday, etc.) may then be provided to the access device 34.

After the phone number is entered into the access device 34, the access device 34 can then generate a first authorization request message with the phone number and payment card information (e.g., an account number, expiration date, etc.), and this can be sent to the payment processing network 26 (step 206). The phone number and card number can then be stored and linked in a database in the payment processing network 26.

In some embodiments, the payment processing network 26 can then use this information to communicate with the consumer 30. For example, an alert message may be sent to the mobile device 32-1 of the consumer 30 informing the consumer 30 that he has been enrolled.

The payment processing network 26 (or a server computer residing therein) can then send a verification token back to the phone (step 210). This may occur in any suitable manner. For example, the payment processing network 26 can send the verification token to the phone (portable consumer device 32-1) via the acquirer 24, merchant 22, and access device 34. Alternatively, it can send the verification token to the phone (portable consumer device 32-1) via the telecommunications gateway 60.

Once the mobile device (mobile device 32-1) has received the verification token, the verification token (which may take any suitable form including one or more characters, and which may be static or dynamic) may be stored in a memory in the phone. In some cases, the verification token is applicable only at a single merchant, or a single type of merchant. In other cases, it may be used at many different merchants.

Once the mobile device has stored the verification token and other payment card information such as the payment card's account number, the mobile device can be used to conduct payment transactions like the payment card. For example, in a subsequent purchase transaction, the mobile device can be used at the access device 34 or some other access device at the same or different merchant (step 212). The mobile device can have a contactless element (as described above), which can then pass the token and other payment credentials (e.g., the account number) to the access device 34 (step 214).

The access device 34 can then send a second authorization request message with the token to the payment processing network 26 (step 216). Also, the mobile device identifier (e.g., mobile phone number), a purchase price, and purchase details (e.g., the products purchased—SKU numbers) for the transaction may also be present in the authorization request message. The payment processing network 26 then analyzes the authorization request message to determine the presence of the token (step 220). If the verification token is present, then "card present" processing is performed (step 222), as opposed to "card not present" processing. The payment processing network 220 can perform processing as if the card was present. The merchant 22 may obtain lower fees (e.g., interchange rate) and may also get chargeback protection. Such benefits would not be present in card not present type of transaction.

Then, the authorization request message is sent to the issuer 28 (step 224) and the issuer decides whether or not to approve the authorization request message. After it decides, it sends an authorization response message back to the access device 34 via the payment processing network 34 and the acquirer 24 (step 226).

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously.

Other methods according to embodiments of the invention are shown in FIGS. 7-22.

Enrollment

Figure 7:
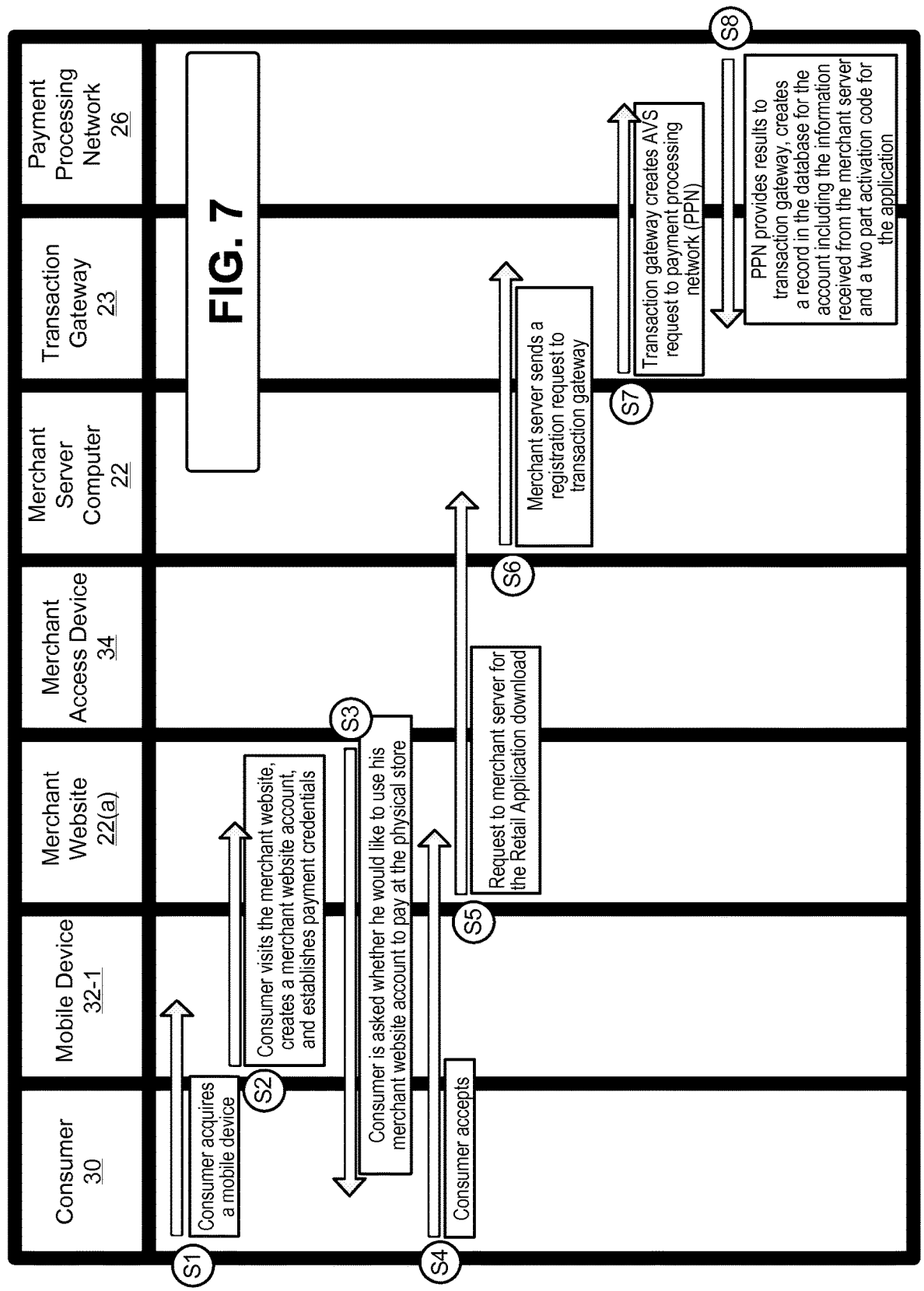
FIGS. 7-10 show a flowchart illustrating an exemplary enrollment method according to an embodiment of the invention.
Figure 8:
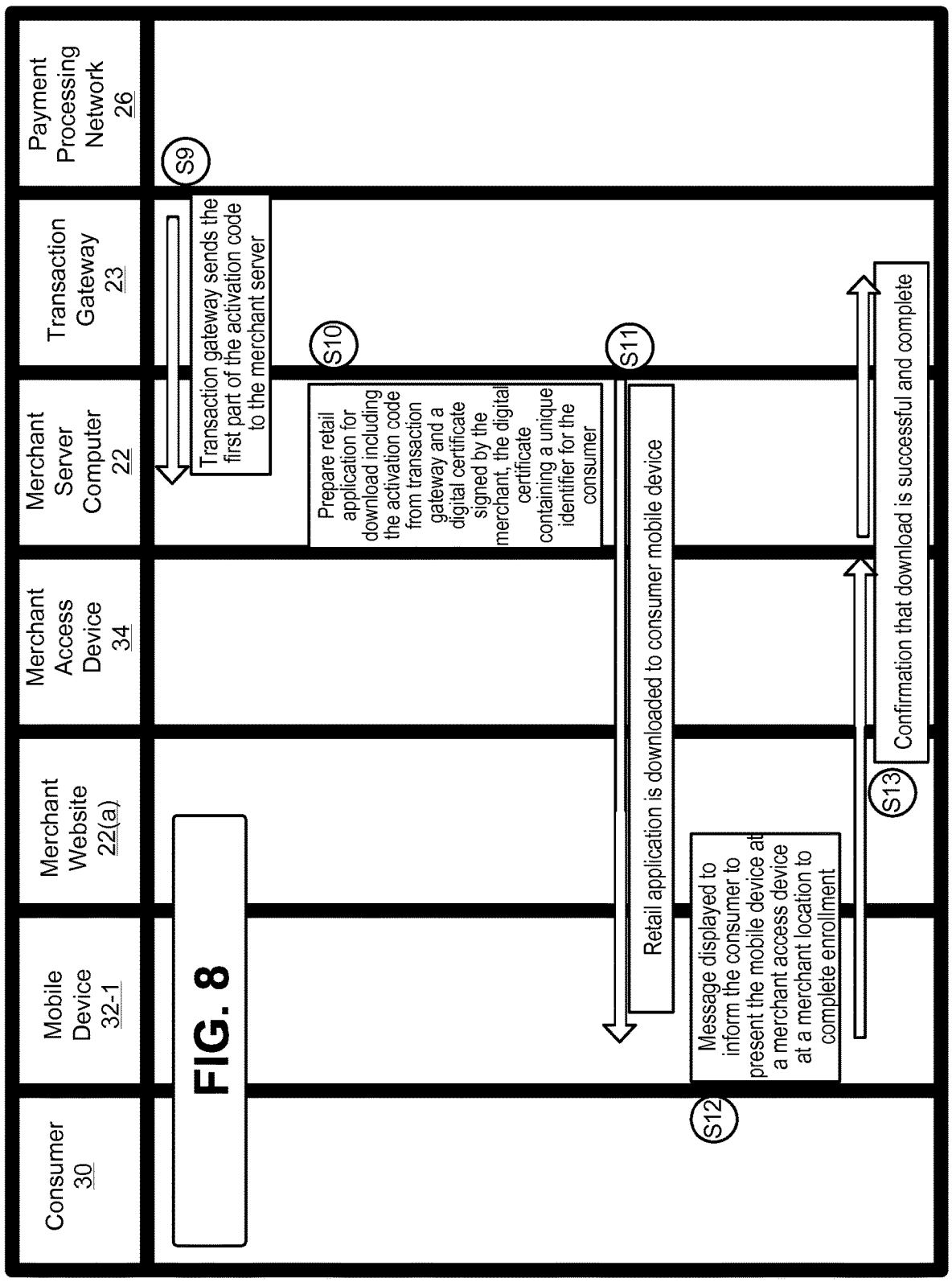
Figure 9:
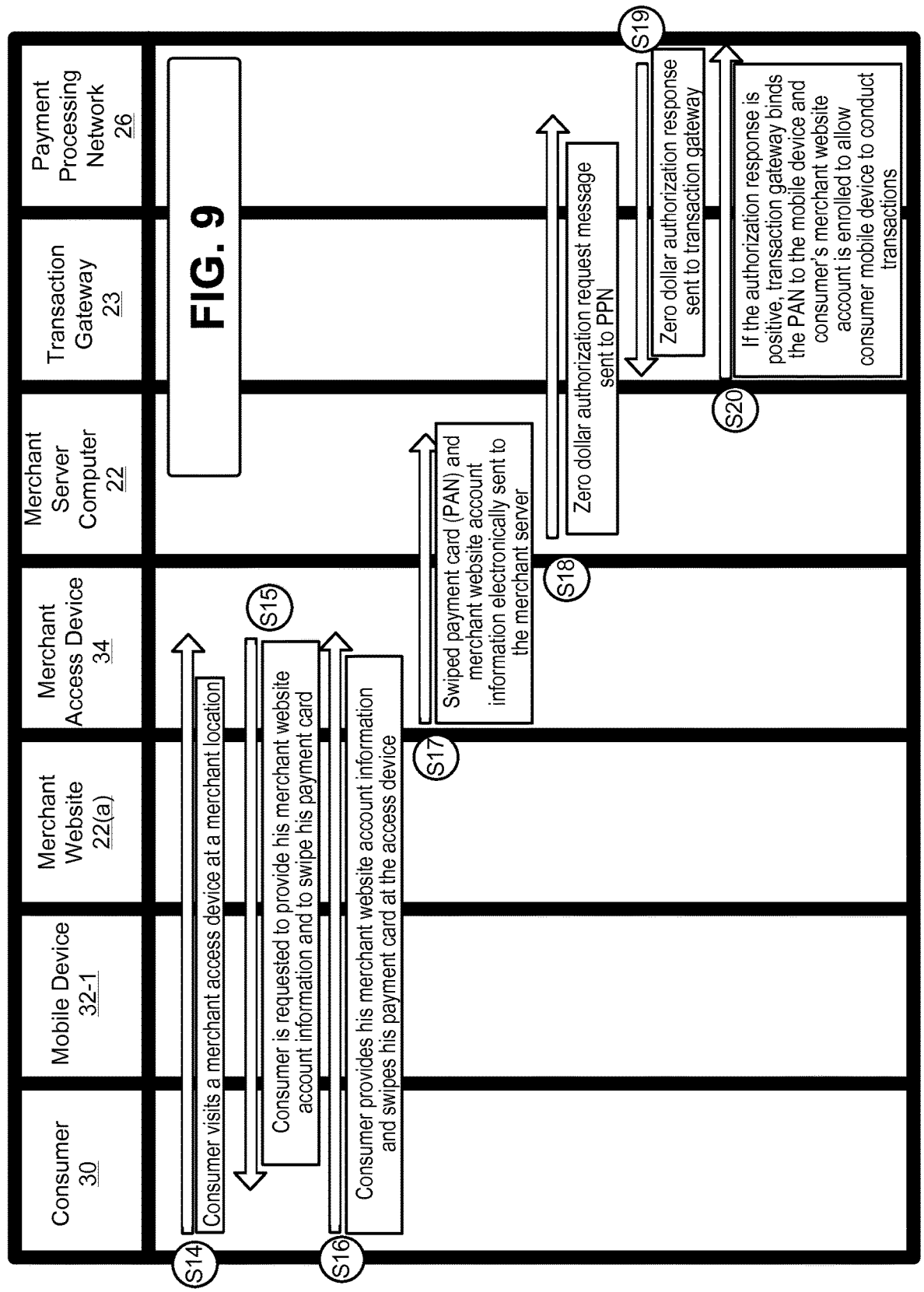
Figure 10:
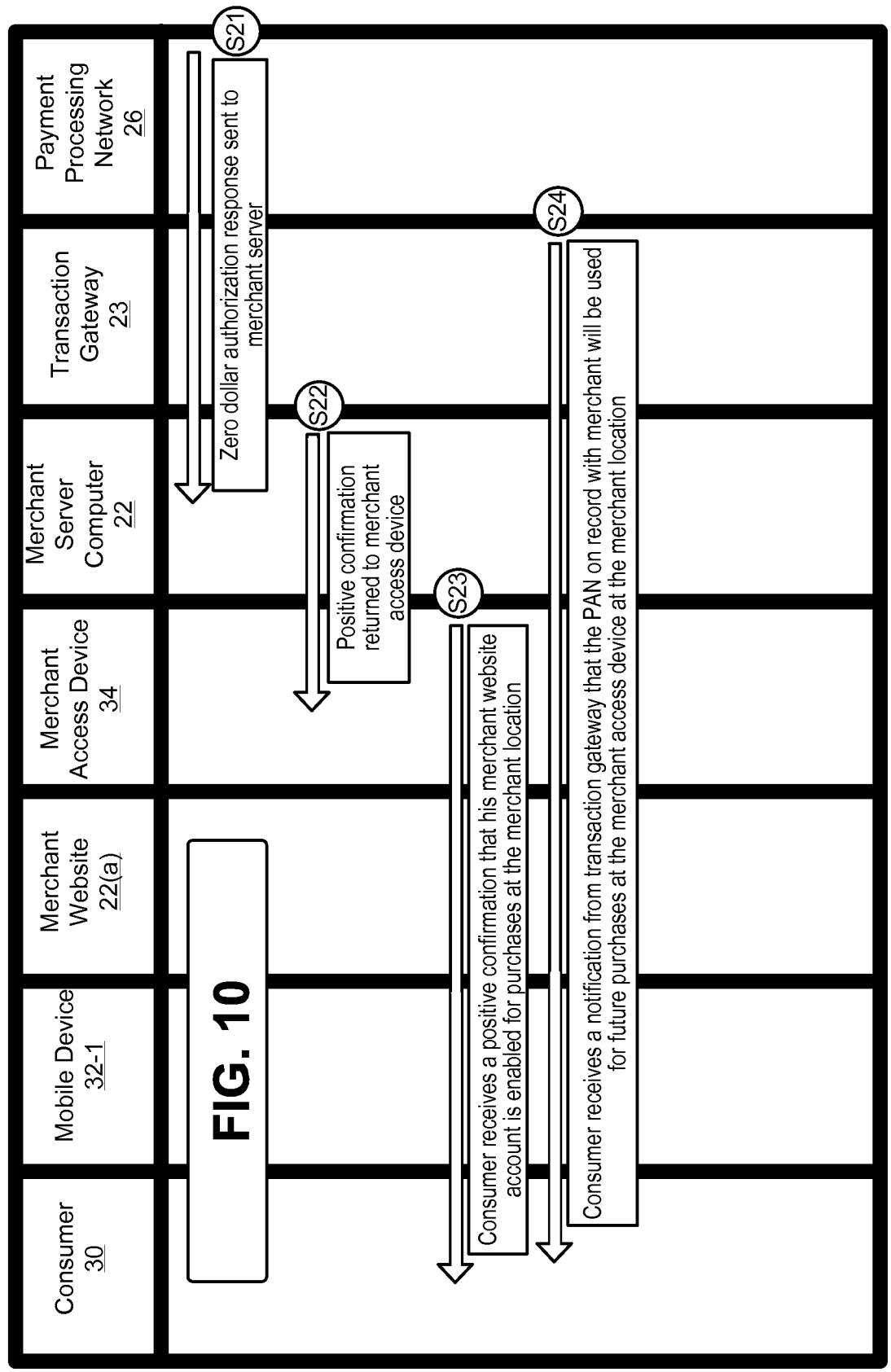

FIGS. 7-10 illustrate an exemplary method of enrolling a mobile device in a program that provides the mobile device with the ability to conduct card-present transactions. FIG. 7 and FIG. 8 (Steps S1-S13) generally describe the process of initially binding a mobile device 32-1 of a consumer 30 and an account of the consumer 30 together. FIG. 9 and FIG. 10

(Steps S14-S24) generally describe the subsequent process of binding the characteristics of the mobile device 32-1 and the account together.

In step S1, the consumer 30 may acquire a mobile device 32, such as a mobile phone (e.g., an iPhone™). The consumer 30, may visit a merchant host site (e.g., iTunes™), which may be a website, as shown in step S2, to create an account with the merchant website 22(*a*) (e.g., an iTunes™ account). During the account creation process, the consumer 30 may provide payment information (e.g., a payment card number), a username, a password, security questions to retrieve merchant website account information, and other information to the merchant website 22(*a*). Other merchant website account information may include contact information (e.g., email address, home address, mobile phone number) and settings (e.g., notification preferences).

Figure 16:
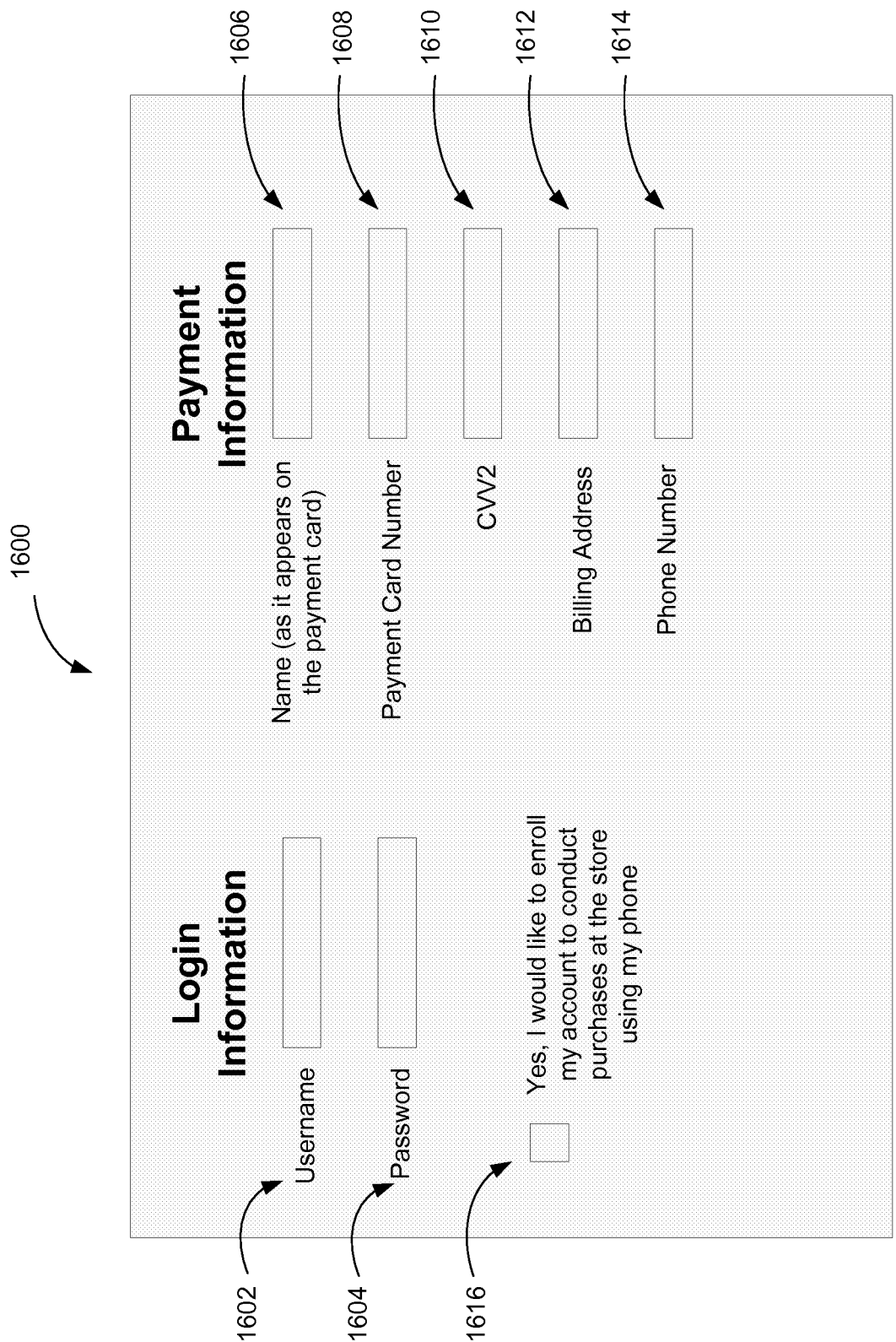
FIG. 16 shows an exemplary user interface on a merchant website according to an embodiment of the invention.

FIG. 16 shows a user interface 1600 that can be associated with steps S2 and S3 (described below). The user interface 1600 may comprise an area to provide consumer information such as a username input region 1602, a password input region 1604, and a phone number input region 1614. The user interface 1600 may also comprise a payment information area comprising a name input region 1606, a payment card number input region 1608, a card verification value input region 1610, and a billing address input region 1612. A selection box 1616 may also be provided to allow the consumer 30 to confirm enrollment in the program.

In step S3, the merchant website 22(*a*) may ask the consumer 30 whether the consumer would like to use the merchant website account at a merchant access device 34 at a merchant location. For example, referring to FIG. 16, the box 1616 may be selected by the consumer 30. When the consumer 30 accepts in step S4, the merchant website 22(*a*) electronically transmits a request to the merchant server 22 for a retail application download to the consumer's mobile device 32, as shown in step S5. For example, the request may be electronically transmitted from the merchant website 22(*a*), displayed to the consumer 30, to the merchant server 22 using a transport layer security protocol similar to Open SSL. The merchant website 22(*a*) may use a secure http session for securely logging and transmitting the consumer 30 information to prevent eavesdropping and tampering of the consumer 30 information.

In step S6, the merchant server 22 electronically transmits a registration request to a transaction gateway 23. The registration request may include any suitable information including any suitable combination of the following: a PAN (Primary Account Number) associated with a portable consumer device (e.g., payment card), a ZIP code, a mobile device identifier (e.g., mobile phone number or phone number alias), an electronic serial number (ESN), an International Mobile Equipment Identity (IMEI), a digital certificate, an application identifier, and merchant website account information (e.g., username, password, security questions).

In step S7, the transaction gateway 23 may create an AVS (account validation service) request and electronically transmits the AVS request to a payment processing network 26 (e.g., VisaNet). The AVS request may include data from the registration request, such as the mobile device identifier, PAN, and merchant website account information.

Figure 6:
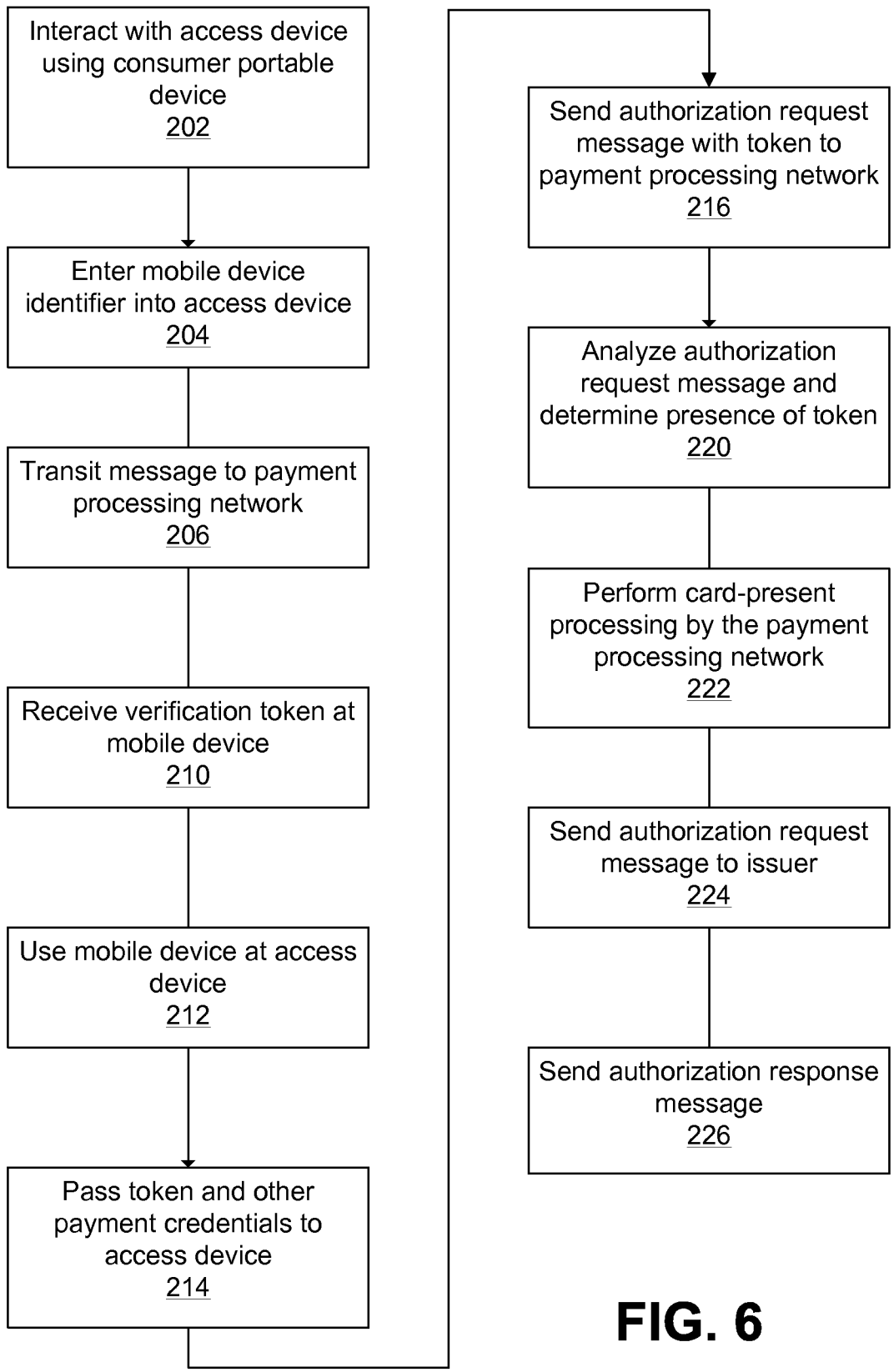
FIG. 6 shows a flowchart illustrating an exemplary method according to an embodiment of the invention.

In step S8, the payment processing network 26 validates the account. Referring to FIG. 6, the registration module 701 of the computer readable medium 26(*d*) of the payment processing network 26 may perform the account validation, including associating the mobile device identifier, payment card, PAN, and other information with the account. The mobile device identifier may be stored in a mobile device identifier database 26(*b*). The payment card, or other portable consumer device, may be stored in a portable consumer device database 26(*a*). When the mobile device identifier has been associated with the PAN, the payment processing network 26 may generate an activation code for the retail application for the mobile device.

The activation code may be generated by any suitable algorithm or a random generator. The activation code may be in any suitable form including, but not limited to, a sequence of letters, numbers, or a combination of both. It may also have a predetermined length. In some embodiments of the invention, the activation code may be a two part activation code, with a first part and a second part used for verification. For example, the activation code may be a 16-digit number, where the first part of the activation code may be the first 8 digits, and the second part of the activation code may be the latter 8 digits.

Referring to FIG. 8, in step S9, the first part of the activation code may be electronically transmitted to the merchant server 22. The second part of the activation code may be retained at the payment processing network 26 or transaction gateway 23. To verify during a purchase transaction, the first part of the activation code (e.g., first 8 digits) will be matched with the second part of the activation code (e.g., latter 8 digits) to result in the complete, original activation code (e.g., 16 digits).

In embodiments of the invention, the first part of the activation code can form part or all of a verification token, which can be used to allow the mobile device 32-1 to be used as a device which can be used as a card present type of device.

In one embodiment of the invention, the payment processing network 26 may retain a hash (SHA1, SHA-256, MD5, etc.) of the activation code along with the second part of the activation code. The first part of the activation code may be discarded by the payment processing network 26 after electronically transmitting it to the merchant server 22. During a purchase transaction, the first part of the activation code (provided by the mobile device 32) and the second part of the activation code (provided by the payment processing network 26) are concatenated and hashed. Before granting authorization, the payment processing network may compare the newly generated hash of the concatenated activation code against the stored hash of the original activation code on the payment processing network 26. The bifurcation of the activation code and separate storage of the two parts of the activation code requires authentication from both the consumer and the payment processing network 26 before the transaction can be authorized, adding an additional layer of security. Furthermore, storage of the two parts of the activation codes in separate geographic locations (first part on the mobile device 32-1, and second part on the payment processing network 26) enables better security, since the transactions may only be authorized when the two parts of the activation code exist together.

In step S10, the merchant server 22 prepares the retail application for download, including the first part of the activation code from the transaction gateway 23. The merchant server 22 may sign a consumer digital certificate including a unique identifier for the consumer (e.g., consumer account number, consumer phone number, serial number, etc.) and the mobile device 32-1 (e.g., UDID). The consumer digital certificate is then electronically transmitted to the consumer's mobile device 32, where it may be stored on a memory on the mobile device 32, including the public key. Additionally, a digital certificate may be issued by a certificate authority (e.g., VeriSign™) and may include a public key associated with the merchant 22 that is also transmitted to the mobile device 32-1. The digital certificate from the certificate authority allows the mobile device 32-1 to attest the identity of the merchant server 22 signing the consumer digital certificate.

In step S11, the consumer 30 downloads the retail application to the mobile device 32-1. The retail application may be customized for different mobile devices and operating systems. The download may also include the first part of the activation code from the transaction gateway 23. The digital certificate signed by the merchant server 22 may also be included in the download of the retail application to verify the identity of the merchant server 22. The mobile device 32-1 may authenticate the download before installing the application and the digital certificate on the mobile device 32-1. The mobile device 32-1 may have access to the public key of the merchant server 22 through a digital certificate issued by the certificate authority (e.g., VeriSign). The mobile device 32-1 may authenticate that the digital certificate is signed by the merchant server 22 by using the public key attributed to the merchant server 22. The mobile device 32-1 may also match the unique identifier for the mobile device 32-1 in the digital certificate against the mobile device's 32 unique identifier stored internally. Once the mobile device 32-1 authenticates the digital certificate and verifies that the digital certificate was issued for that particular device, the application, digital certificate and any associated data may be installed on the mobile device 32-1.

Figure 18:
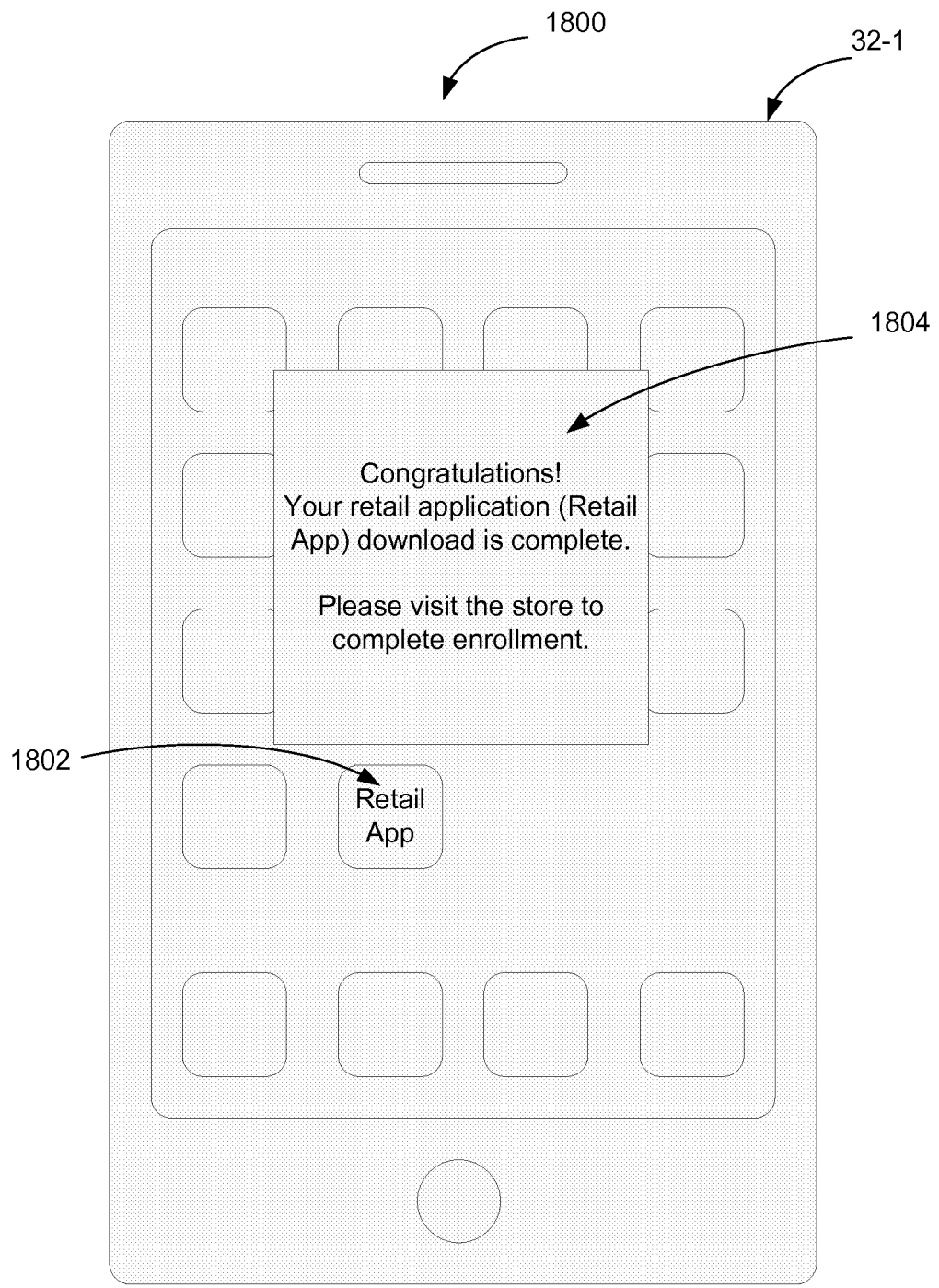
FIGS. 18-19 show exemplary user interfaces on a mobile device during an enrollment according to an embodiment of the invention.

In step S12, and referring to FIG. 18, after the download is complete, a message 1804 may be displayed on an interface 1800 on the consumer's mobile device 32-1. The message may inform the consumer 30 to present the mobile device 32-1 at a merchant access device 34 at a merchant location to complete enrollment. FIG. 18 also shows an icon 1802 for the retail application.

In some embodiments of the invention, the message may be displayed only when a wireless communication protocol such as Bluetooth™ is disabled when the retail application is launched. If the protocol is disabled, the retail application informs the consumer 30 that the protocol will be automatically enabled when using the mobile device 32-1 to conduct a transaction at a merchant access device 34 at a merchant location.

In step S13, a confirmation message may be electronically transmitted to the merchant server 22. The confirmation message may indicate that the retail application download to the mobile device 32-1 was successful and complete. The confirmation message may be forwarded from the merchant server 22 to the transactions gateway 23.

Referring to FIG. 9, in step S14 of the enrollment process, the consumer 30 may visit a merchant access device 34 at a merchant location. The merchant location may be a physical store and the merchant access device 34 may be a kiosk that the consumer 30 can interact with.

FIG. 17 shows an exemplary user interface 1700 that can be associated with step S15, described below. The user interface 1700 may be displayed on an access device at a merchant location. To complete enrollment, the user interface 1700 may comprise an area to request information such as a username input region 1704, and a password input region 1704, corresponding to a merchant website account username and password. To conduct a purchase transaction using an enrollment merchant website account, the user interface 1700 may comprise a button 1702 to activate a connection between the mobile device 32-1 and the access device 34.

In step S15, the consumer 30 may be requested to provide the merchant website account login information at the merchant access device 34 (as shown in FIG. 17). The merchant access device 34 may also request the consumer 30 to present the portable consumer device (e.g., payment card) associated with the merchant website account of the consumer 30.

In step S16, the consumer 30 may provide different types of information to the access device 34. Such information may include an identifier (e.g., a phone number) for a mobile device, and other suitable information. For example, the merchant website account login information (e.g., username, password, mobile device identifier) may be provided to the merchant access device 34. This may be done manually by entering the username and password associated with the consumer's 30 merchant website account. The consumer 30 may also present the portable consumer device to interact with the merchant access device 34 by swiping, tapping, or other suitable means of communicating the portable consumer device with the merchant access device 34. In this way, payment data (e.g., an account number, expiration date, service code, CVV, redundancy error code, etc.), can be received at the access device 34.

In step S17, the merchant access device 34 electronically receives payment data associated with the portable consumer device. The payment data is similar to the information stored on a magnetic strip of a payment card. Receipt of the payment data by the access device 34 may increase the confidence that the portable consumer device is physically present at the time of enrollment before binding of the consumer's account to the portable consumer device by the payment processing network 26. Including the payment data associated with a portable consumer device 32 in the transaction helps subvert attacks involving enrollment of mobile devices using stolen account information. The payment data and merchant website account information (e.g., username, password, mobile device identifier) provided by the consumer 30 at the merchant access device 34 may then be electronically transmitted to the merchant server 22.

In step S18, at the merchant server 22, a zero dollar authorization request is generated and electronically transmitted (sent) to the payment processing network 26. The payment processing network 26 may then forward the zero authorization request message to an issuer (not shown). The zero dollar authorization request message may include the account identifier associated with the portable consumer device (e.g., a payment card), the mobile device identifier, or other data to verify that the portable consumer device is in good standing.

In step S19, when the account identifier associated with the portable consumer device has been verified, the payment processing network 26 may receive an authorization response message from the issuer (not shown). The payment processing network 26 electronically transmits a zero dollar authorization response to the transaction gateway 23.

In step S20, the transaction gateway 23 receives the zero dollar authorization response in step S20, and if the zero dollar authorization response is positive, the transaction gateway 23 binds the account identifier associated with the portable consumer device (e.g., PAN) to the mobile device 32-1. An enrollment request is generated by the transaction gateway and electronically transmitted to the payment processing network 26, so that the consumer 30 may use the merchant website account, including the mobile device 32-1 that is associated with the PAN, to conduct transactions.

Referring to FIG. 10, in step S21, after the enrollment request has been received by the payment processing network 26, the consumer's merchant website account is now enrolled and the consumer's mobile device 32-1 is bound to the PAN associated with the portable consumer device. The positive zero dollar authorization response message and/or positive authorization response message are electronically transmitted from the payment processing network 26 to the merchant server 22.

In step S22, the positive authorization response message is electronically forwarded to the merchant access device 34. The merchant access device 34 may display to the consumer 30 a message informing the consumer 30 of the positive authorization response.

Figure 19:
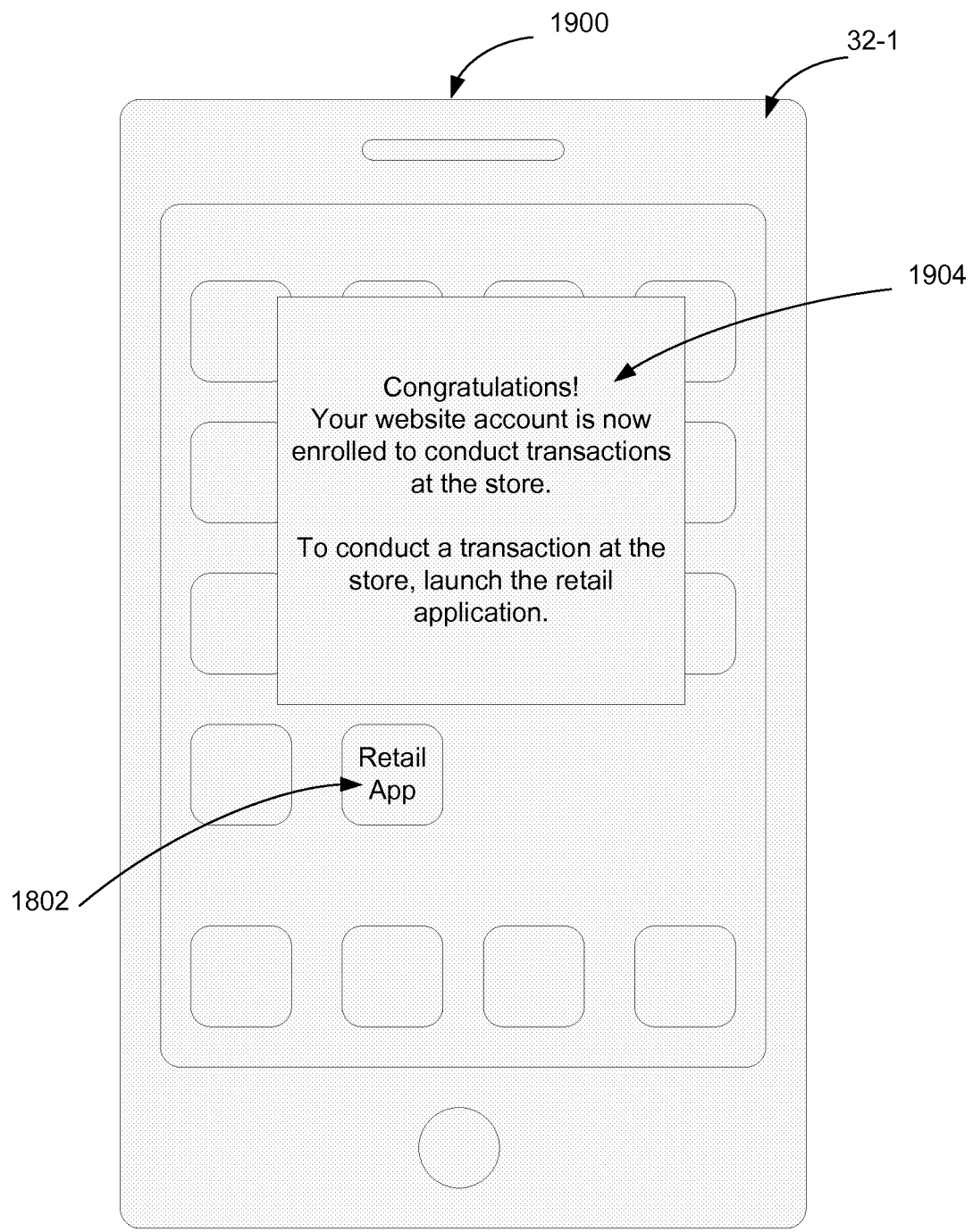

In step S23, and referring to FIG. 19, the merchant access device 34 may communicate with the consumer's mobile device 32-1, and the consumer 30 may receive a notification on the mobile device 32-1. The notification may be a message 1904, informing the consumer 30 that the merchant website account is now enrolled and enabled to conduct purchases at the merchant access device 34 at the merchant location using the mobile device 32-1.

In step S24, the transaction gateway 23 may electronically transmit a notification to the consumer 30. The notification from the transaction gateway 23 may notify the consumer 30 that the account identifier (e.g., PAN) associated with the portable consumer device recorded in the consumer's 30 merchant website account, including the consumer's mobile device 32, may be used for future purchase transactions at the merchant access device 34 at the merchant location.

Purchase Transaction

FIGS. 11-14 illustrate an exemplary method of conducting a purchase transaction after enrollment, using a mobile device 32-1 at a merchant access device at a merchant location according to an embodiment of the invention. During the purchase transaction, the mobile device 32-1 may directly communicate with the payment processing network 26 through the transaction gateway 23 to retrieve a dynamic card verification value (dCVV2) that is specific to that particular purchase transaction (detailed in steps P8-P11). The mobile device 32-1 uses the dCVV2 received from the payment processing network 26 to complete the purchase transaction with the merchant 22. The use of a dCVV2 value in embodiments of the invention is optional.

Figure 11:
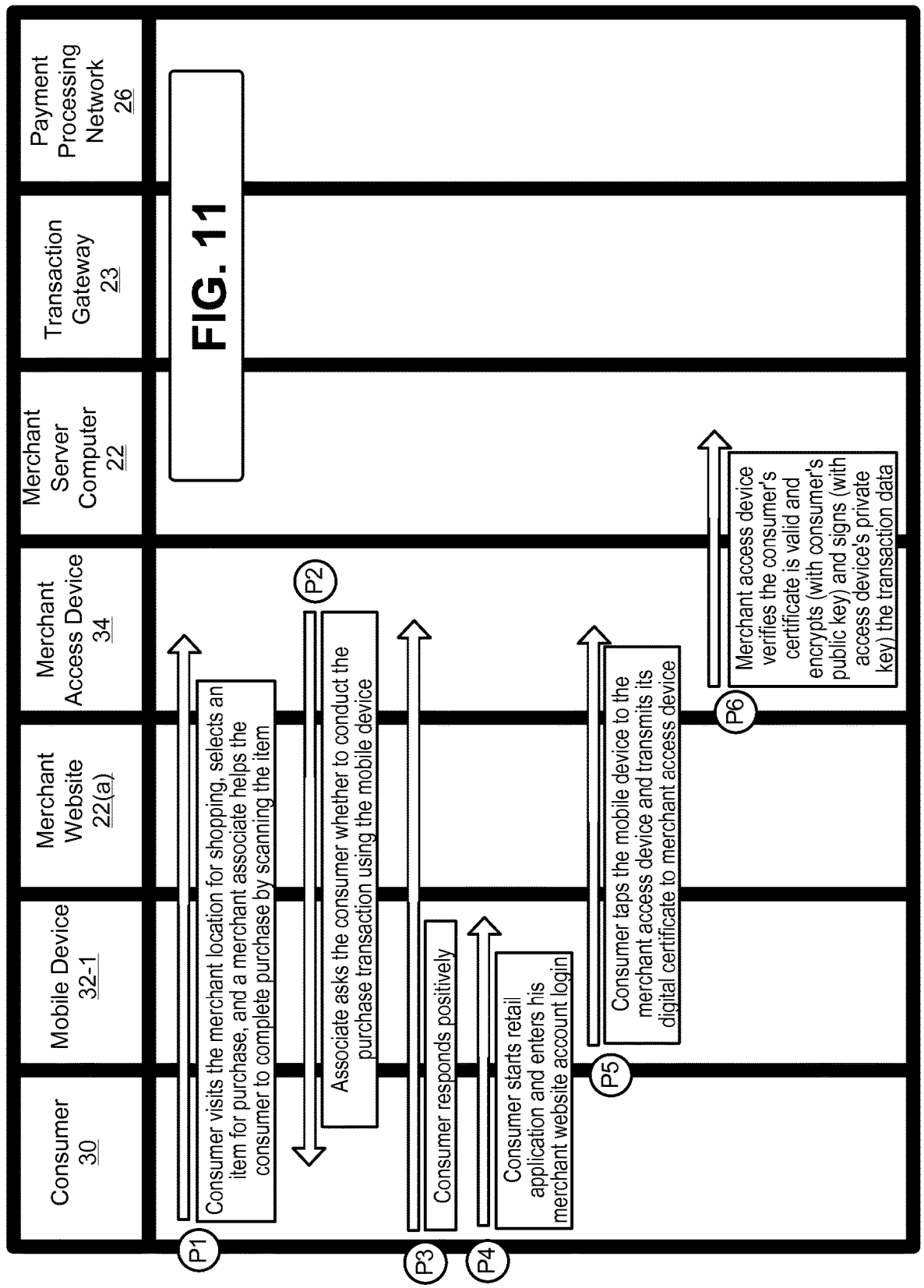
FIGS. 11-14 show a flowchart illustrating an exemplary method of conducting a purchase transaction according to an embodiment of the invention.

Referring to FIG. 11, in step P1, the consumer 30 goes to the merchant location to select an item for purchase. A merchant associate may assist the consumer 30 by scanning the item at the merchant access device 34.

In step P2, the merchant associate may ask the consumer whether he wants to conduct the purchase transaction using the mobile device 32-1. The mobile device 32-1 may have an associated mobile device identifier recorded with the consumer's 30 merchant website account. The merchant associate may ask the consumer 30, or in other embodiments, the merchant access device 34 may prompt the consumer 30 on a display.

In step P3, the consumer 30 may respond positively. The consumer may respond orally to the merchant associate, or by interacting with the merchant access device 34 to confirm that the consumer 30 wishes to conduct the purchase transaction using the mobile device 32-1.

In step P4, the consumer 30 may open the retail application on the mobile device 32-1. Referring to FIGS. 18-19, to open the retail application on the mobile device 32-1, the consumer 30 may click on the retail application icon 1802. To initiate the retail application, the consumer 30 may be prompted to enter the merchant website login information (e.g., username and password) to access the retail application. Through the retail application, the consumer 30 is able to log into the merchant website account.

Figure 20:
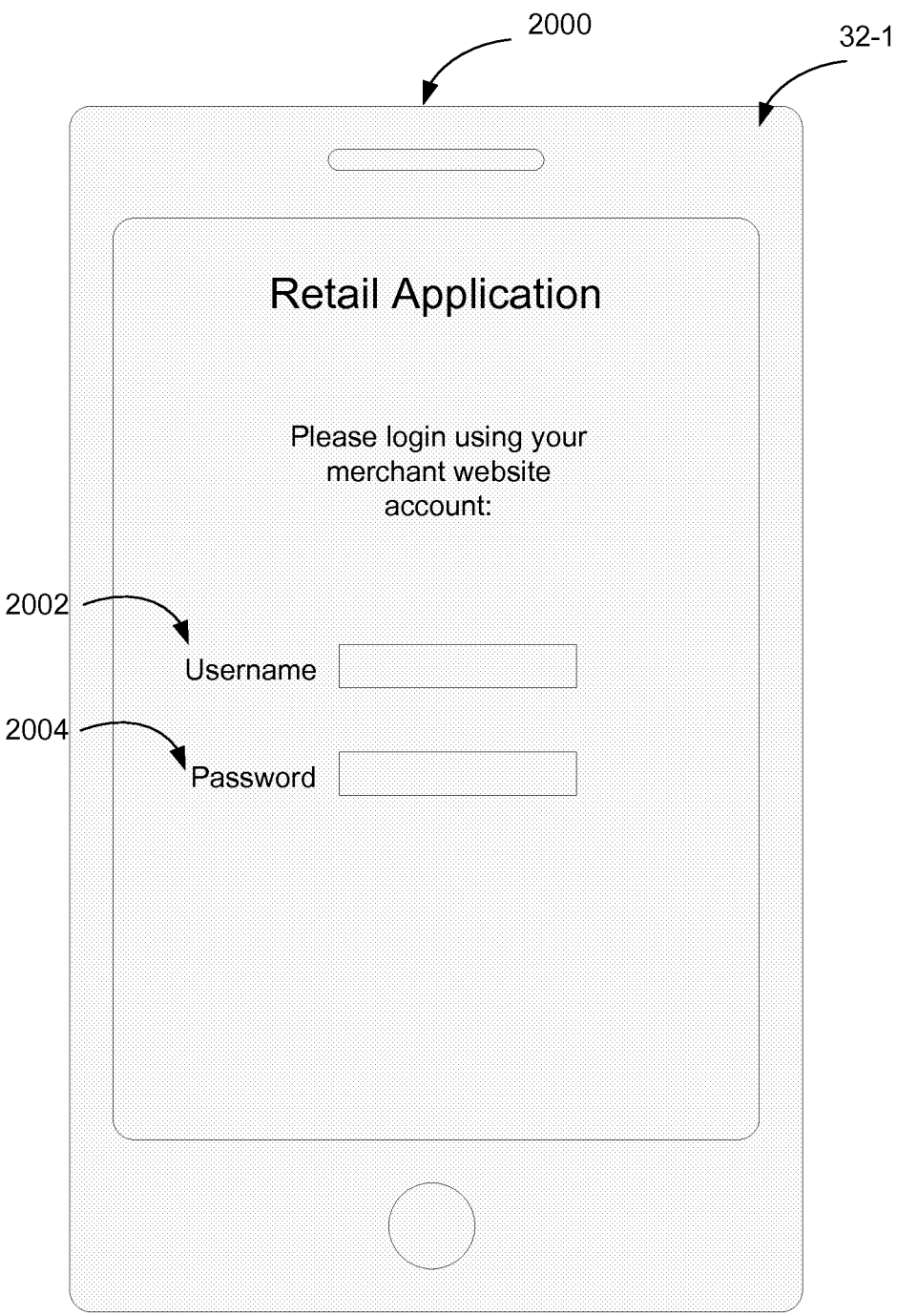
FIGS. 20-22 show exemplary user interfaces on a mobile device during a purchase transaction according to an embodiment of the invention.

FIG. 20 shows an exemplary user interface 2000 on a mobile device 32-1, The user interface 2000 may comprise an area requesting information, such as a username input region 2002 and a password input region 2004, corresponding to the consumer's merchant website account. For example, the consumer 30 may enter the username and password created and used to login into the consumer's merchant website account.

In step P5, the consumer 30 may use the mobile device 32-1 to interact with the merchant access device 34, by tapping, holding the mobile device 32-1 in close proximity to the merchant access device 34. The mobile device 32-1 electronically transmits, via Bluetooth™ or other wireless network protocol, the consumer digital certificate to the merchant access device 34.

The consumer digital certificate may be associated with the mobile device 32, and may be stored on the mobile device 32-1. Referring to FIG. 8, step S10, the consumer digital certificate was signed by the merchant server 22 and issued to the consumer 30 in the retail application download. The consumer digital certificate may contain the consumer's unique identifier (e.g., serial number) and may be encrypted by the public key stored on the mobile device 32-1 prior to transmission.

In step P6, the merchant access device 34 electronically receives the consumer digital certificate and verifies whether the consumer's digital certificate is valid. A private key associated with the public key stored on the mobile device 32-1 may be used to decrypt the consumer digital certificate, thus verifying that the consumer's digital certificate is valid. The private key may be stored on a memory on the merchant access device 34. The merchant access device 34 then encrypts with the consumer's public key and digitally signs with the merchant access device's private key, transaction data (e.g., item, SKU, amount) to be electronically transmitted to the mobile device 32-1.

Figure 12:
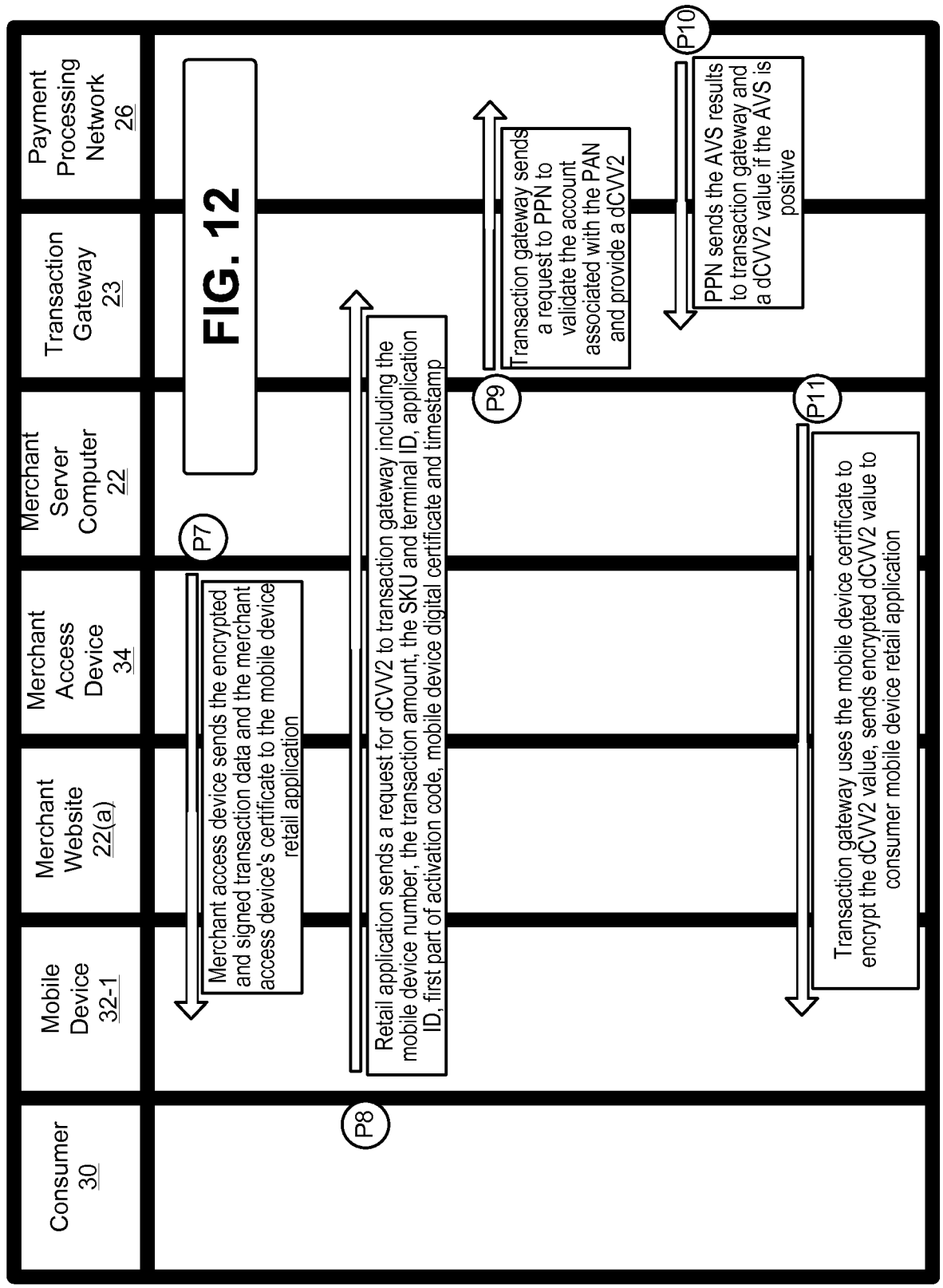

Referring to FIG. 12, in step P7, the merchant access device 34 electronically communicates with the mobile device 32-1. A merchant access device certificate may be issued by a certificate authority (e.g., VeriSign™). The merchant access device 34 may encrypt and digitally sign the transaction data (e.g., item, SKU, amount) as discussed in step P6. The merchant access device certificate, as well as the encrypted and signed transaction data, may be electronically transmitted from the merchant access device 34 to the retail application on the mobile device 32-1. Only the mobile device 32-1 can decrypt the electronically transmitted transaction data using the private key stored internally in the mobile device's 32-1 memory. Furthermore, the mobile device 32-1 has the public key associated with the merchant access device's 34 private key. The mobile device 32-1 can verify the authenticity of the transaction data electronically transmitted from the merchant access device 34 using the public key associated with the merchant access device 34. Therefore, the consumer access device 32 can verify the confidentiality, authenticity and integrity of the transmitted transaction data from the merchant access device 34.

The merchant access device 34 and the mobile device 32-1 may communicate through Bluetooth™ or other suitable wireless communications means. The transaction data may include a transaction identifier, descriptions of the purchased items, SKU's associated with the items, amount, tax, and the total purchase price. The transaction data may also include a nonce and a merchant access device 34 timestamp to be signed by the consumer's digital certificate.

The nonce and the merchant access device 34 timestamp are used in step P13 and P14 to maintain confidentiality of the data transmitted and to secure the transaction against replay attacks (as further discussed in reference to step P13).

Figure 21:
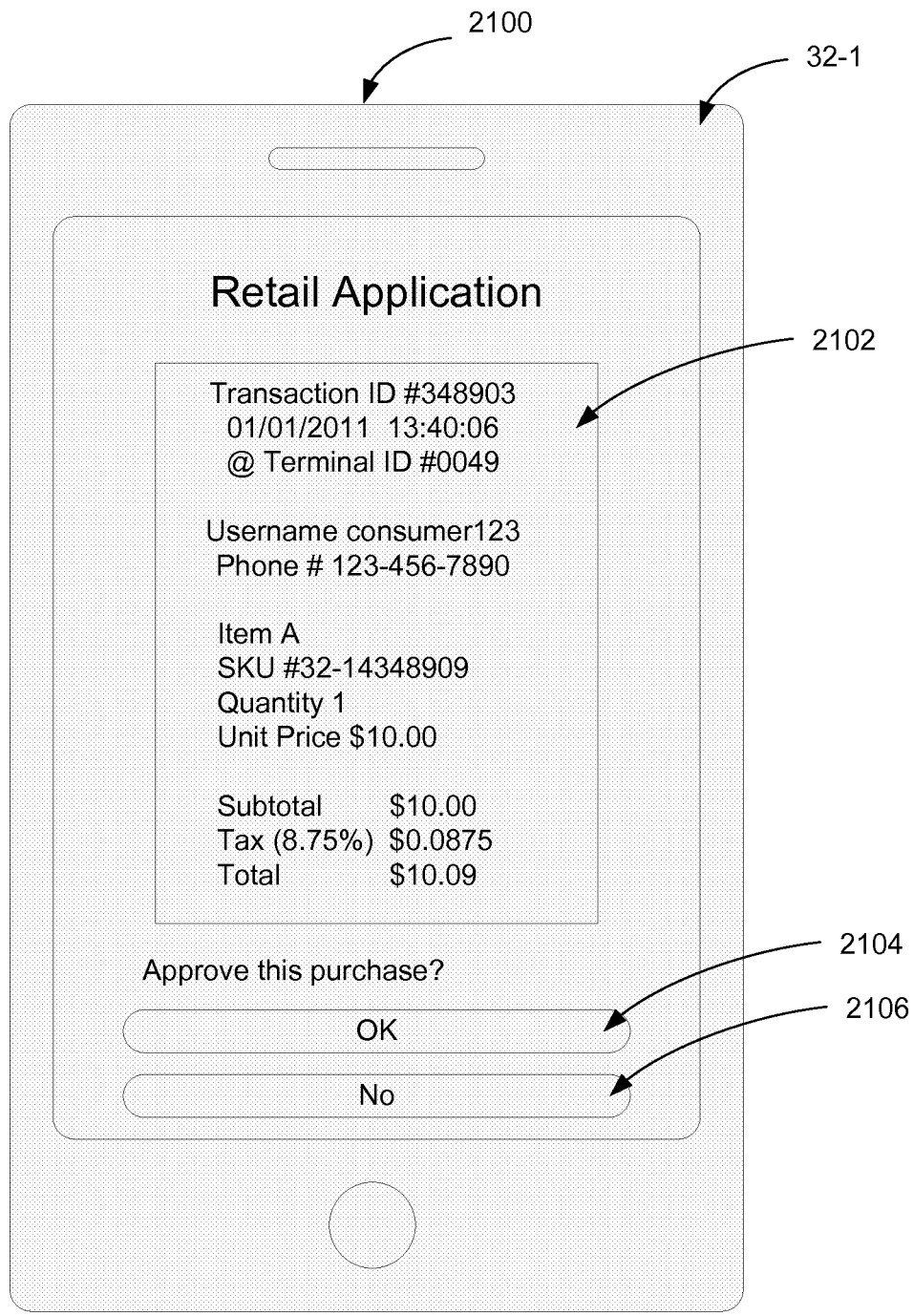

FIG. 21 shows an exemplary user interface 2100 on a mobile device 32-1. The user interface 2100 may comprise a viewing area displaying transaction data 2102. For example, the transaction data displayed in viewing area 2102 includes a transaction ID, date, timestamp, terminal ID, items purchased (including quantity, SKU's, price), subtotal, tax, and total amount. The consumer's merchant account username and mobile phone number may also be displayed in viewing area 2102. The user interface 2100 may also comprise an "OK" button 2104 for the consumer 30 to approve and continue the purchase transaction, or a "No" button 2106 to cancel the purchase transaction.

In step P8, through the retail application on the mobile device 32, a request for a dynamic card verification value (dCVV2), or other verification value, may be electronically transmitted to the transaction gateway 23. The dCVV2 request may also include the mobile device identifier (e.g., mobile phone number), transaction data (e.g., transaction identifier, items, amount), an access device (e.g., terminal) identifier, the retail application identifier, the first part of the activation code (i.e., verification token downloaded via the retail application during enrollment, see S10 of FIG. 8), the consumer digital certificate, and a timestamp.

The mobile device 32-1 verifies the certificate chain of trust, then verifies the signature of the encrypted transaction data, and decrypts the transaction data. The decrypted transaction data may be displayed on the mobile device 32-1. The transaction data (e.g., transaction identifier), nonce, and timestamp sent by the merchant access device 34 may be hashed and signed by the consumer's private key stored on the mobile device 32-2.

The transaction gateway 23 electronically receives the dCVV2 request. The transaction gateway 23 may use the retail application identifier, the first part of the activation code, the mobile device identifier or other data to determine the associated merchant website account. The transaction gateway 23 may communicate with the payment processing network 26 to retrieve records of mobile device identifiers and portable consumer device identifiers stored in the mobile device identifier database (see 26(*c*) of FIG. 6) and the portable consumer device database (see 26(*d*) of FIG. 6), respectively.

In step P9, the transaction gateway electronically submits an account validation service (AVS) request to the payment processing network 26 to validate the determined consumer's merchant website account and the associated portable consumer device. The payment processing network 26 may check the associated account standing and provide a dCVV2. A dCVV2 may be determined using an algorithm or a random number generator.

In one embodiment of the invention, the payment processing network 26 may also check if a valid first part of the activation code is submitted. The payment processing network 26 may concatenate the first part of the activation code electronically received with the second part of the activation code electronically stored in the payment processing network (during step S9) and hash the concatenated value. Before granting authorization, the payment processing network 26 may compare the newly generated hash of the concatenated activation code against the stored hash of the original activation code on the payment processing network 26 (stored during step S9). If the newly generated hash of the concatenated activation code matches the stored hash of the original activation code on the payment processing network 26, then the transaction may be authorized.

In step P10, the payment processing network 26 electronically transmits an AVS response message back to the transaction gateway 23. If the AVS results are positive, the AVS response message may include the dCVV2.

In step P11, the transaction gateway 23 may use the consumer digital certificate to encrypt the dCVV2 and electronically transmit the encrypted dCVV2 to the mobile device 32-1 retail application. The AVS response associated with the mobile device 32-1 may be recorded at the transaction gateway 23.

Figure 13:
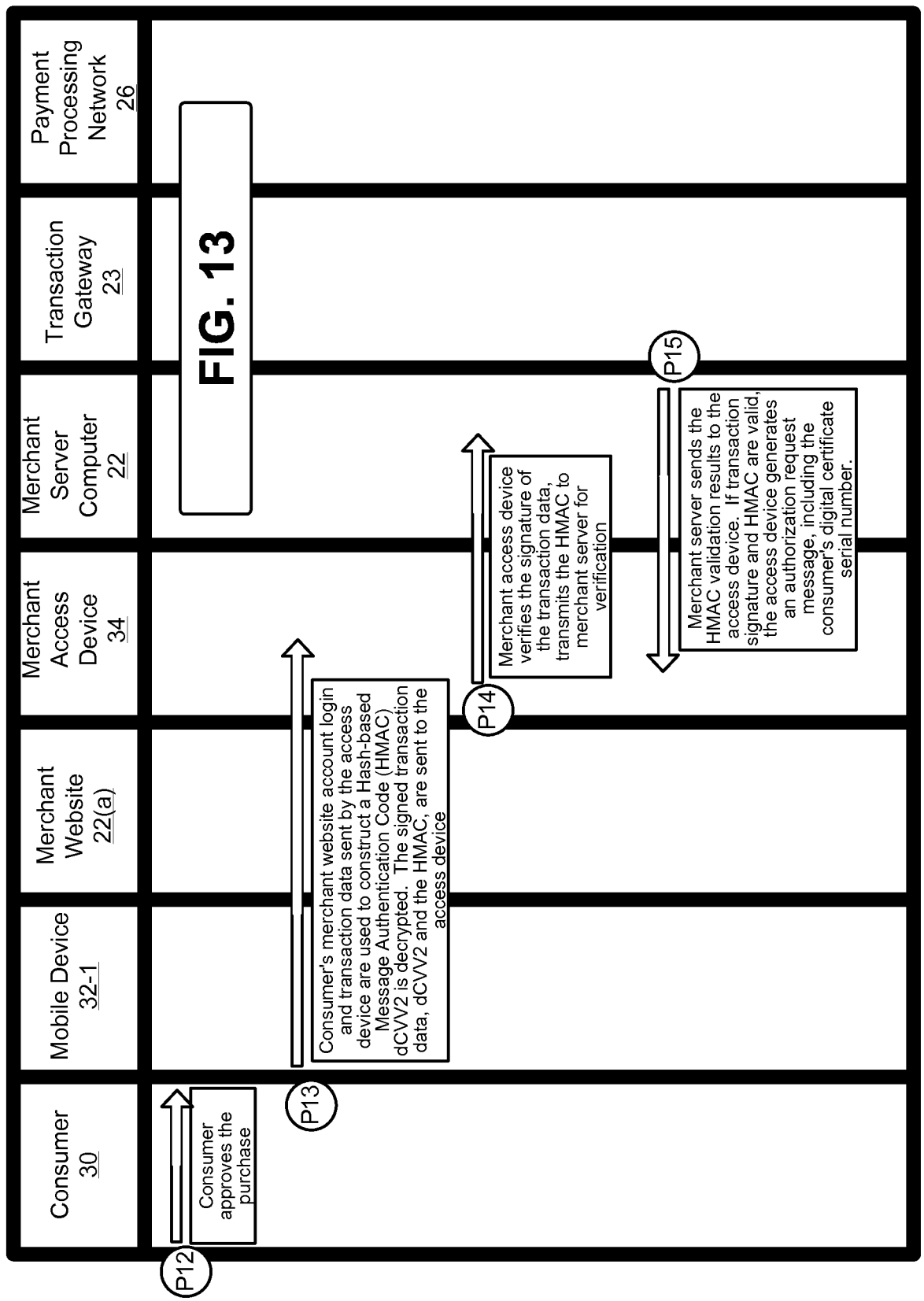

Referring to FIG. 13, in step P12, the consumer 30 may be prompted by the retail application on the mobile device 32-1 to approve the purchase transaction. For example, referring to FIG. 21, the consumer 30 may click the "OK" button 2104 displayed via the retail application on the mobile device to approve and continue with the purchase transaction.

In step P13, through the retail application on the mobile device 32, the consumer's merchant website account information (e.g., username), nonce, and timestamp sent by the merchant access device 34, in step P7, are used to construct a hash-based message authentication code (HMAC). Referring back to step P7, the nonce and the merchant access device 34 timestamp are encrypted along with other transaction data when electronically transmitted from the merchant access device 34 to the mobile device 32-1. The confidentiality of the nonce and the merchant access device 34 timestamp is used to provide secure communication between the mobile device 32-1 and the merchant access device 34. The nonce may be unique per transaction and per communication allowing a defense against replay attacks. If the merchant access device 34 receives a duplicate or a modified message with the same nonce more than once, the merchant access device 32 may discard that message and log a potential attack on the system. Similarly, the merchant access device 34 timestamp may allow the merchant access device to expire transaction data associated with that particular merchant access device 34 timestamp and discard any messages associated with that merchant access device 34 timestamp if a response for the transaction is not received from the mobile device 32-1 in a pre-determined window of time. The encrypted dCVV2 received by the mobile device 32-1 from the transaction gateway 23, in step P11, is also decrypted by the mobile device 32-1 using the private key associated with the consumer digital certificate. The dCVV2 and the HMAC are electronically transmitted to the merchant access device 34 from the retail application of the mobile device 32-1.

In step P14, the merchant access device 34 may verify the signature of the transmitted dCVV2 and HMAC, by using the private key stored on the merchant access device 34. Then, the merchant access device 34 electronically transmits the decrypted HMAC to the merchant server 22 for verification.

In step P15, the merchant server 22 electronically transmits a HMAC validation response to the merchant access device 34. If the signature and the HMAC are valid, the merchant access device 34 is instructed to generate an authorization request message. The authorization request message may include a serial number associated with the consumer digital certificate, verification value received by the mobile device 32-1, and verification token.

Figure 14:
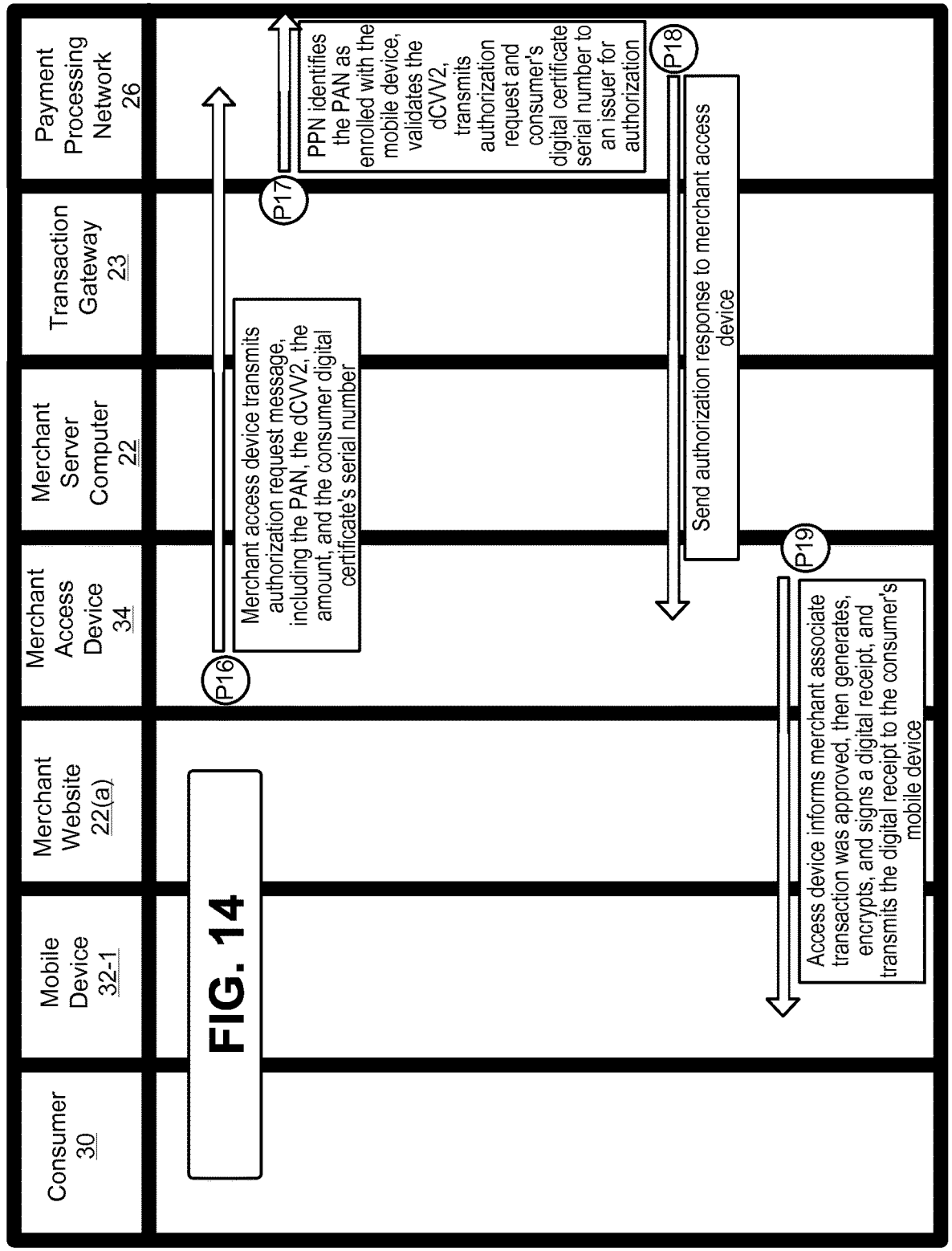

Referring to FIG. 14, in step P16, the merchant access device 34 electronically transmits the authorization request message, including the associated portable consumer device, the transaction data, verification value received by the mobile device 32-1, verification token (i.e., first part of the activation code), and the consumer digital certificate serial number. The associated portable consumer device may be determined by the merchant access device 34 communicating with the merchant server 22 to electronically search for the associated merchant website account information, look up the associated mobile device, and retrieve the associated portable consumer device.

In step P17, the payment processing network identifies the portable consumer device as enrolled and bound to the mobile device. The dCVV2 may then be validated, and the payment processing network may electronically transmit the authorization request, including the consumer digital certificate's serial number to an issuer for authorization. In some embodiments of the invention, there may be other rules and restrictions regarding enrollment of the mobile device and the consumer's merchant website account.

In step P18, the payment processing network 26 electronically receives an authorization response from the issuer. The authorization response is electronically transmitted to the merchant access device 34.

Figure 22:
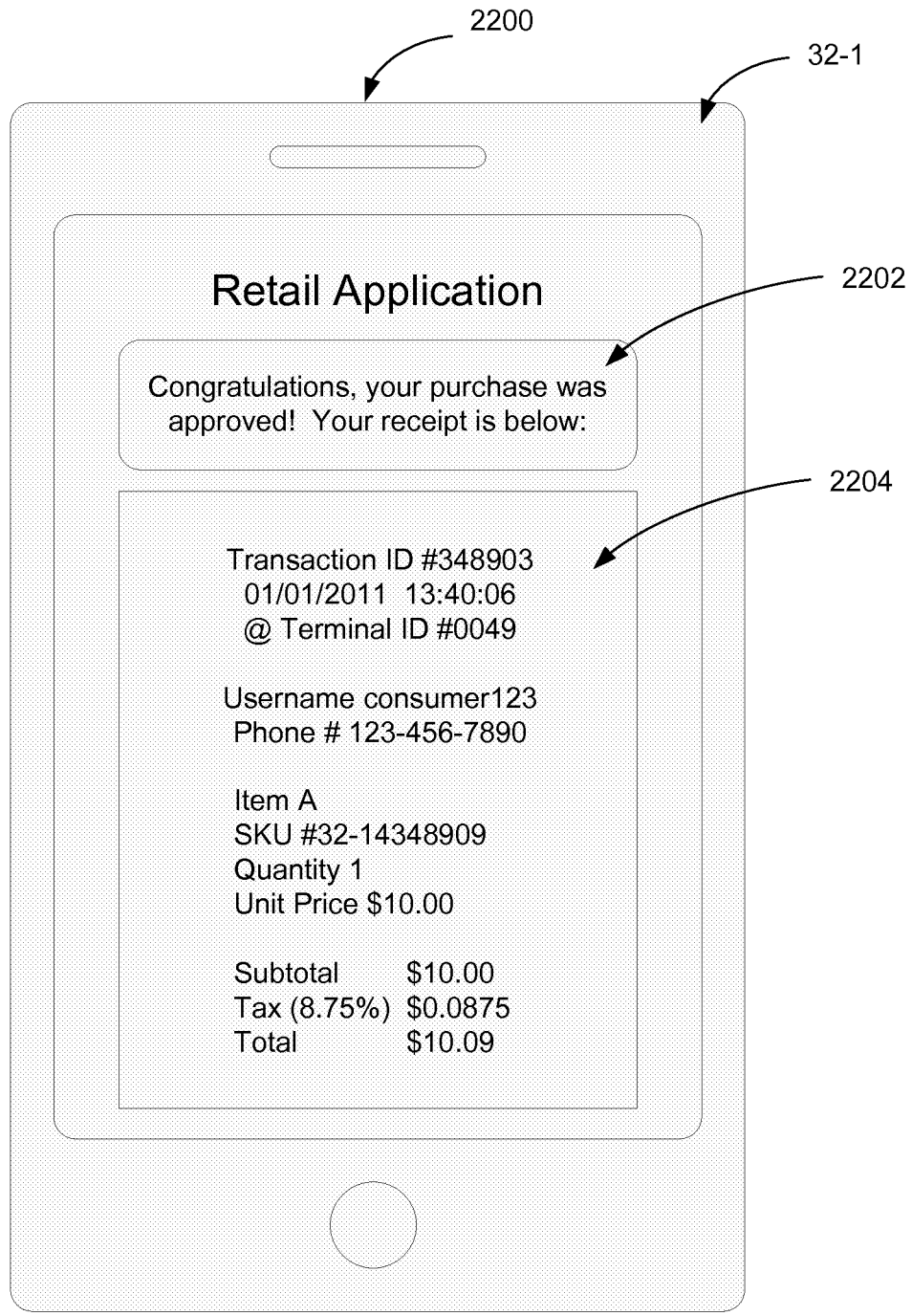

In step P19, the merchant access device 34 informs the merchant associate that the purchase transaction was approved. The merchant access device 34 may encrypt and sign a digital receipt. The digital receipt may be electronically transmitted to the mobile device 32, thus completing the purchase transaction. Referring to FIG. 22 showing an exemplary user interface 2200 on a mobile device 32-1, a message 2202 may be displayed to inform the consumer 30 that the purchase transaction was approved and is complete. The user interface 220 may also include an area 2204 displaying the digital receipt or other transaction data.

Embodiments of the invention have a number of advantages. For example, mobile device manufacturers do not need to modify their mobile devices with special security or near-field communication chips, merchants do not need to modify their access devices, and other existing infrastructure elements do not need to be changed in a significant manner in order to obtain card present types of transactions for devices that would not traditional satisfy card present types of transaction standards.

Embodiments of the invention allow payments to be made with a mobile device (e.g., a phone) as a "card present" type of transaction, even though the mobile device does not have the type of chip that would normally be required for a card present transaction. The consumer may use the mobile device and does not need to present a portable consumer device (e.g., payment card) normally required to conduct the "card present" type of transaction, reducing the number of items or devices the consumer needs to carry. Although the payment card is not present, embodiments of the invention allow the transaction to be processed as a "card present" transaction, eliminating fees or interchange rates often associated with "card not present" transactions.

Additionally, it would be advantageous to combine the convenience of conducting transactions using a mobile device with the security of in-person transactions. Furthermore, possessing multiple portable consumer devices (e.g., credit cards, debit cards, ATM cards) to conduct both in-person transactions and online transactions can be cumbersome. It can be difficult for the consumer to keep track of all the different portable consumer devices and may forget to bring a specific portable consumer device for a specific transaction, such as using a merchant-specific credit card at an associated merchant. Having multiple portable consumer devices also makes them prone to loss or theft. Therefore improved and simplified systems and methods of conducting payment transactions online and in-person are needed. Improved security, and prevent loss or theft of confidential data.

In some embodiments, the merchant may also operate a Website that has an account that is associated with the mobile device, and that requires a password for access. This password can also be used to access a verification token when enrollment of the phone with the payment processing network can takes place at the access device.

Also, in other embodiments, the enrollment of the consumer's mobile device can alternatively take place after a consumer swipes his portable consumer device (e.g., payment card) in an actual transaction. That is, for example, after a payment card is swiped in a transaction, the consumer may be asked to enroll in a particular program and enter a mobile device identifier (e.g., phone number). Thus, in this case, only one payment card swipe can be used to make a purchase and start the enrollment process.

In other embodiments, after the payment processing network has verified the consumer's data (e.g., phone number, e-mail address, etc.), a dynamic or static authentication code can be sent to the user's phone. This code can then be passed from the consumer's phone to the access device (e.g., via an RF link, via keyboard entry, or via some other communication link) in the payment process, and this code can be sent in the authorization request message back to the payment processing network. This is yet another way to authenticate the consumer. This can show the payment processing network that this transaction is authentic and the transaction may be eligible for a lower interchange rate.

From the foregoing description, embodiments of the invention can provide customer registration and activation for a card present processing program. It can provide the merchant with services for registration of the consumer to participate in the card present program including in-store consumer registration, capture of consumer factors of identification (e.g., PAN, email, legal name, phone IMIS, MSIDN, etc.), invocation of "qualification evaluation" to confirm the consumer is qualified for the card present processing program, real-time "instant" activation of qualified consumers for the 'CP' program, and reporting and analytics on consumer registration and activation metrics. It can also provide card present processing of online transactions for consumers qualifying for the card present processing program, as well as transactions for consumers enrolled in the card present processing program via the merchant's online store (e.g., iTunes™) will be handled as card present transactions. It may also provide tokenization of consumer transactions, and tokenization of one or more of a i) Transaction ID (TID), ii) Account Number (PAN), iii) Merchant ID (MID), iv) store ID, and v.) Product Identifier.

Embodiments of the invention may also provide standards and regulatory compliance. Embodiments of the invention may provide secure storage of PAN and transaction data while providing the merchant with a secure token so that the merchant can access data for analytics without compromising personal private information or account number information. Embodiments of the invention may also provide for multi-factor tokenization to enable consumer analytics across payment products, stores, and geographies. Embodiments of the invention may also be used to manage dispute resolution (approach for managing disputes, such as charge backs and refunds, as card present transactions for electronic music purchases).

A recitation of "a", "an" or "the" is intended to mean "one or more" unless specifically indicated to the contrary.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a server computer from an access device, a first authorization request message for generation of a verification token, wherein the first authorization request message includes payment data and an identifier for a mobile communication device;
   generating, by the server computer, an activation code including a first part and a second part, wherein the first part of the activation code includes the verification token, wherein the verification token indicates that the payment data is authentic;
   generating, by the server computer, a hash of the activation code;
   storing, by the server computer, the second part of the activation code and the hash of the activation code;
   transmitting, by the server computer, the first part of the activation code to the mobile communication device via the access device without transmitting the second part of the activation code, wherein the mobile communication device stores the first part of the activation code, whereby the mobile communication device is thereafter used to conduct a payment transaction using the verification token;
   receiving, by the server computer, a second authorization request message associated with the payment transaction, the second authorization request message including the first part of the activation code;
   concatenating, by the server computer, the first part of the activation code and the second part of the activation code into a concatenated activation code;
   generating, by the server computer, a hash of the concatenated activation code;
   comparing, by the server computer, the hash of the concatenated activation code to the hash of the activation code;
   processing, by the server computer, the payment transaction as a card present transaction based on the verification token being present in the second authorization request message and without requiring data obtained from a chip during card present transactions; and
   authorizing, by the server computer, the payment transaction based on the comparing.

2. The method of claim 1 wherein the identifier for the mobile communication device and the payment data are stored and linked in a database coupled to the server computer.

3. The method of claim 1 wherein the second authorization request message includes the payment data and a purchase price for the payment transaction along with the first part of the activation code.

4. The method of claim 1 wherein the verification token is static.

5. The method of claim 1 wherein the verification token is dynamic.

6. The method of claim 1 wherein the server computer comprises a digital certificate management module.

7. The method of claim 1 wherein the access device is a point of sale terminal.

8. The method of claim 7 wherein the access device and the mobile communication device are present at a merchant location of a merchant.

9. The method of claim 8 wherein the verification token can only be used at the merchant.

10. The method of claim 9 wherein the verification token verifies that authentic payment data has been presented to the access device in form of a payment card in connection with the first authorization request message.

11. A system comprising:
    a server computer comprising:
      a processor, and
      a non-transitory computer readable medium coupled to the processor, the non-transitory computer readable medium storing executable instructions that, when executed by the processor, cause the processor to perform the steps of:
        receiving, from an access device, a first authorization request message for generation of a verification token, wherein the first authorization request message includes payment data and an identifier for a mobile communication device;
        generating an activation code including a first part and a second part, wherein the first part of the activation code includes the verification token, wherein the verification token indicates that the payment data is authentic;
        generating a hash of the activation code;

storing the second part of the activation code and the hash of the activation code;

transmitting the first part of the activation code to the mobile communication device via the access device without transmitting the second part of the activation code, wherein the mobile communication device stores the first part of the activation code, whereby the mobile communication device is thereafter used to conduct a payment transaction using the verification token;

receiving a second authorization request message associated with the payment transaction, the second authorization request message including the first part of the activation code;

concatenating the first part of the activation code and the second part of the activation code into a concatenated activation code;

generating a hash of the concatenated activation code;

comparing the hash of the concatenated activation code to the hash of the activation code;

processing the payment transaction as a card present transaction based on the verification token being present in the second authorization request message and without requiring data obtained from a chip during card present transactions; and authorizing the payment transaction based on the comparing.

12. The system of claim 11 wherein the identifier for the mobile communication device and the payment data are stored and linked in a database coupled to the server computer.

13. The system of claim 11 wherein the second authorization request message includes the payment data and a purchase price for the payment transaction along with the first part of the activation code.

14. The system of claim 11 wherein the verification token is static.

15. The system of claim 11 wherein the verification token is dynamic.

16. The system of claim 11 wherein the server computer comprises a digital certificate management module.

17. The system of claim 11 wherein the verification token can only be used at the access device.

18. The system of claim 11 wherein the verification token verifies that authentic payment data has been presented to the access device in form of a payment card in connection with the first authorization request message.

* * * * *